(12) United States Patent
Ota et al.

(10) Patent No.: US 7,076,355 B2
(45) Date of Patent: Jul. 11, 2006

(54) SHIFT CONTROL APPARATUS FOR VEHICLE STEP-VARIABLE AUTOMATIC TRANSMISSION

(75) Inventors: Hirofumi Ota, Toyota (JP); Atsushi Honda, Seto (JP); Akiharu Abe, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/939,377

(22) Filed: Sep. 14, 2004

(65) Prior Publication Data

US 2005/0090962 A1 Apr. 28, 2005

(30) Foreign Application Priority Data

Oct. 3, 2003 (JP) ............................. 2003-346269

(51) Int. Cl.
*B60K 17/06* (2006.01)
*F16H 59/66* (2006.01)

(52) U.S. Cl. ............................. 701/51; 701/65; 477/34
(58) Field of Classification Search ................ 701/51, 701/55, 56, 65; 477/34, 97, 71, 74, 92, 93, 477/171, 173
See application file for complete search history.

(56) References Cited

U.S. PATENT DOCUMENTS

| | | | | |
|---|---|---|---|---|
| 5,231,582 A * | 7/1993 | Takahashi et al. | ............. | 701/56 |
| 6,064,935 A * | 5/2000 | You | ............. | 701/55 |
| 6,098,005 A * | 8/2000 | Tsukamoto et al. | ............. | 701/65 |
| 6,249,735 B1 * | 6/2001 | Yamada et al. | ............. | 701/65 |
| 6,311,118 B1 * | 10/2001 | Ito et al. | ............. | 701/95 |
| 6,346,064 B1 * | 2/2002 | Hada et al. | ............. | 477/171 |

FOREIGN PATENT DOCUMENTS

| | | |
|---|---|---|
| JP | 59-50261 | 3/1984 |
| JP | 5-65953 | 3/1993 |
| JP | 8-159267 | 6/1996 |
| JP | 2001-132832 | 5/2001 |

OTHER PUBLICATIONS

Service Department Toyota Jidosha Kabushiki Kaisha, Excerpt from Toyota "Celsior" New Model (UCF3), Instruction Manual, Aug. 2000, pp. 2-18 and 2-19.

* cited by examiner

*Primary Examiner*—Dalena Tran
(74) *Attorney, Agent, or Firm*—Oblon, Spivak, McClelland, Maier & Neustadt, P.C.

(57) ABSTRACT

A shift control apparatus for controlling shifting actions of a step-variable automatic transmission for a vehicle, which has a plurality of selectable groups of forward-drive positions having respective different sets of speed ratios, each one of the selectable groups of forward-drive positions including at least one high-speed position each having a speed ratio which is different from that of each high-speed position of any other of the selectable groups, the shift control apparatus including a drive-force-increase determining portion operable to determine whether it is necessary to increase a drive force of the vehicle with the automatic transmission placed in any high-speed position, and a drive-position-group selecting portion operable to select one of the selectable groups of forward-drive positions which includes the at least one high-speed position each having the speed ratio higher than that of each high-speed position of any other of the selectable groups, when the drive-force-increase determining portion has determined that it is necessary to increase the drive force of the vehicle with the automatic transmission placed in any high-speed position.

12 Claims, 16 Drawing Sheets

| | C1 | C2 | C3 | C4 | B1 | B2 | B3 | SPEED RATIO | STEPPING RATIO |
|---|---|---|---|---|---|---|---|---|---|
| 1st | ○ | | | | | | ○ | 4.169 | |
| | | | | | | | | | 1.359 |
| 2nd | ○ | | | | | ○ | | 3.067 | |
| | | | | | | | | | 1.351 |
| 3rd | ○ | | | | ○ | | | 2.271 | |
| | | | | | | | | | 1.301 |
| 4th | ○ | ○ | | | | | | 1.745 | |
| | | | | | | | | | 1.321 |
| 5th | ○ | | | ○ | | | | 1.321 | |
| | | | | | | | | | 1.321 |
| 6th | | | ○ | ○ | | | | 1.000 | |
| | | | | | | | | | 1.282 |
| 7th | | ○ | ○ | | | | | 0.780 | |
| | | | | | | | | | 1.295 |
| 8th | | | ○ | | | ○ | | 0.602 | |
| Rev | | ○ | | | | ○ | | 2.644 | SPREAD 6.921 |

|  | C1 | C2 | C3 | C4 | B1 | B2 | B3 | SPEED RATIO | STEPPING RATIO |
|---|---|---|---|---|---|---|---|---|---|
| 1st | ○ |  |  |  |  |  | ○ | 4.169 | |
| 2nd | ○ |  |  |  |  | ○ |  | 3.067 | 1.359 |
| 3rd | ○ |  |  |  | ○ |  |  | 2.271 | 1.351 |
| 4th | ○ | ○ |  |  |  |  |  | 1.745 | 1.301 |
| 5th | ○ |  | ○ |  |  |  |  | 1.321 | 1.321 |
| 6th |  |  | ○ | ○ |  |  |  | 1.000 | 1.321 |
| 7th |  | ○ |  | ○ |  |  |  | 0.811 | 1.232 |
| 8th |  |  |  | ○ | ○ |  |  | 0.648 | 1.253 |
| Rev |  | ○ |  |  |  |  | ○ | 2.644 | SPREAD 6.433 |

|  | C1 | C2 | C3 | C4 | B1 | B2 | B3 | SPEED RATIO | STEPPING RATIO |
|---|---|---|---|---|---|---|---|---|---|
| 1st | ○ |  |  |  |  |  | ○ | 4.169 | 1.359 |
| 2nd | ○ |  |  |  |  | ○ |  | 3.067 | 1.351 |
| 3rd | ○ |  |  |  | ○ |  |  | 2.271 | 1.301 |
| 4th | ○ | ○ |  |  |  |  |  | 1.745 | 1.321 |
| 5th | ○ |  | ○ |  |  |  |  | 1.321 | 1.321 |
| 6th |  |  | ○ | ○ |  |  |  | 1.000 | 1.282 |
| 7th |  | ○ | ○ |  |  |  |  | 0.780 | 1.295 |
| 8th |  |  | ○ | ○ |  |  |  | 0.602 | SPREAD 6.921 |
| Rev |  | ○ |  |  |  | ○ |  | 2.644 |  |

|  | C1 | C2 | C3 | C4 | B1 | B2 | B3 | SPEED RATIO | STEPPING RATIO |
|---|---|---|---|---|---|---|---|---|---|
| 1st | ○ |  |  |  |  |  | ○ | 4.169 | |
| 2nd | ○ |  |  |  |  | ○ |  | 3.067 | 1.359 |
| 3rd | ○ |  |  |  | ○ |  |  | 2.271 | 1.351 |
| 4th | ○ | ○ |  |  |  |  |  | 1.745 | 1.301 |
| 5th | ○ |  | ○ |  |  |  |  | 1.321 | 1.321 |
| 6th |  |  | ○ | ○ |  |  |  | 1.000 | 1.321 |
| 7th |  | ○ |  | ○ |  |  |  | 0.765 | 1.308 |
| 8th |  |  |  | ○ | ○ |  |  | 0.581 | 1.316 |
| Rev |  | ○ |  |  |  | ○ |  | 2.644 | SPREAD 7.175 |

FIG.14

SHIFT LEVER MOVEMENT FOR RANGE SELECTION
+ ← UP ——— DOWN → −

| | SPEED RATIO AND STEPPING RATIO | | | FORWARD-DRIVE POSITIONS AVAILABLE IN EACH RANGE | | | | | |
|---|---|---|---|---|---|---|---|---|---|
| | POSITION | SPEED RATIO | STEPPING RATIO | RANGE D | RANGE 7 | RANGE 6 | RANGE 5 | ... | RANGE L |
| NORMAL-SPREAD GROUP | 1st | 4.169 | 1.359 | 1st | 1st | 1st | 1st | | 1st |
| | 2nd | 3.067 | 1.351 | 2nd | 2nd | 2nd | 2nd | | |
| | 3rd | 2.271 | 1.301 | 3rd | 3rd | 3rd | 3rd | | |
| | 4th | 1.745 | 1.321 | 5th | 4th | 4th | 4th | ... | |
| | 5th | 1.321 | 1.321 | 4th | 5th | 5th | 5th | | |
| | 6th | 1.000 | 1.282 | 6th | 6th | 6th | | | |
| | 7th | 0.780 | 1.295 | 7th | 7th | | | | |
| | 8th | 0.602 | | 8th | | | | | |
| NARROW-SPREAD GROUP | 1st | 4.169 | 1.359 | 1st | 1st | 1st | 1st | | 1st |
| | 2nd | 3.067 | 1.351 | 2nd | 2nd | 2nd | 2nd | | |
| | 3rd | 2.271 | 1.301 | 3rd | 3rd | 3rd | 3rd | | |
| | 4th | 1.745 | 1.321 | 4th | 4th | 4th | 4th | ... | |
| | 5th | 1.321 | 1.321 | 5th | 5th | 5th | 5th | | |
| | 6th | 1.000 | 1.232 | 6th | 6th | 6th | | | |
| | 7th | 0.811 | 1.253 | 7th | 7th | | | | |
| | 8th | 0.648 | | 8th | | | | | |
| WIDE-SPREAD GROUP | 1st | 4.169 | 1.359 | 1st | 1st | 1st | 1st | | 1st |
| | 2nd | 3.067 | 1.351 | 2nd | 2nd | 2nd | 2nd | | |
| | 3rd | 2.271 | 1.301 | 3rd | 3rd | 3rd | 3rd | | |
| | 4th | 1.745 | 1.321 | 4th | 4th | 4th | 4th | ... | |
| | 5th | 1.321 | 1.321 | 5th | 5th | 5th | 5th | | |
| | 6th | 1.000 | 1.308 | 6th | 6th | 6th | | | |
| | 7th | 0.765 | 1.316 | 7th | 7th | | | | |
| | 8th | 0.581 | | 8th | | | | | |

AUTOMATIC OR MANUAL SELECTION

FIG.18

| | C1 | C2 | C3 | B1 | B2 | B3 | B4 | SPEED RATIO | STEPPING RATIO |
|---|---|---|---|---|---|---|---|---|---|
| 1st | ○ | | | | ○ | | ○ | 4.020 | |
| 2nd | ○ | | | | ○ | ○ | | 2.717 | 1.480 |
| 3rd | ○ | ○ | | | ○ | | | 2.000 | 1.358 |
| 4th | ○ | ○ | | ○ | | | | 1.538 | 1.300 |
| 5th | ○ | | ○ | ○ | | | | 1.211 | 1.271 |
| 6th | ○ | ○ | ○ | | | | | 1.000 | 1.211 |
| 7th-2 | | ○ | ○ | | ○ | | | 0.784 | 1.275 |
| 8th | | | ○ | | | ○ | | 0.645 | 1.216 |
| R1 | | ○ | | | ○ | | ○ | 3.636 | SPREAD 6.231 |
| R2 | | ○ | | ○ | | | ○ | 2.797 | |

|       | C1 | C2 | C3 | B1 | B2 | B3 | B4 | SPEED RATIO | STEPPING RATIO |
|-------|----|----|----|----|----|----|----|-------------|----------------|
| 1st   | ○  |    |    |    | ○  |    | ○  | 4.020       | 1.480          |
| 2nd   | ○  |    |    |    | ○  | ○  |    | 2.717       | 1.358          |
| 3rd   | ○  | ○  |    |    | ○  |    |    | 2.000       | 1.300          |
| 4th   | ○  | ○  |    | ○  |    |    |    | 1.538       | 1.271          |
| 5th   | ○  |    | ○  | ○  |    |    |    | 1.211       | 1.211          |
| 6th   | ○  | ○  | ○  |    |    |    |    | 1.000       | 1.204          |
| 7th-1 |    | ○  | ○  | ○  |    |    |    | 0.831       | 1.288          |
| (8th) |    |    | ○  |    |    | ○  |    | 0.645       |                |
| R1    |    | ○  |    |    | ○  |    | ○  | 3.636       | SPREAD 6.231   |
| R2    |    | ○  |    | ○  |    |    | ○  | 2.797       |                |

SHIFT CONTROL APPARATUS FOR VEHICLE STEP-VARIABLE AUTOMATIC TRANSMISSION

This application is based on Japanese Patent Application No. 2003-346269 filed Oct. 3, 2003, the contents of which are incorporated hereinto by reference.

BACKGROUND OF THE INVENTION

1. Field of the Invention

The present invention relates in general to a shift control apparatus for a vehicle step-variable automatic transmission having a plurality of selectable groups of forward-drive positions having respective different sets of speed ratios, and more particularly to techniques associated with the shift control apparatus, for improving the drivability of a vehicle by suitably selecting one of the groups of forward-drive positions of the automatic transmission, which enables the vehicle to be driven with an adequate drive force with the automatic transmission placed in a relatively high-speed forward-drive position.

2. Discussion of Related Art

A known shift control apparatus for a vehicle step-variable automatic transmission tends to suffer from frequent alternate shift-up and shift-down actions of the automatic transmission for repeated alternate acceleration and deceleration of the vehicle so as to maintain the vehicle speed at a constant value while a relatively large vehicle drive force is required with the automatic transmission placed in a relatively high-speed forward-drive position, for example, while the vehicle is running on an uphill roadway. The frequent shift-up and shift-down actions of the automatic transmission are felt uncomfortable by the vehicle operator. A vehicle transmission shift control apparatus to overcome this drawback is proposed on pages 2–18 and 2–19 of Toyota "CELSIOR" New Model Instruction Manual, August 2000, published by the Service Department of Toyota Jidosha Kabushiki Kaisha. This shift control apparatus is arranged to detect an uphill running of the vehicle on the basis of the running speed and an opening angle of a throttle valve, and restrict a shift-up action of the automatic transmission to a relatively high-speed forward-drive position during the detected uphill running of the vehicle, so as to enable the vehicle to be driven with a sufficient drive force while restricting frequent shifting actions of the automatic transmission.

The step-variable automatic transmission has only one group of forward-drive positions which have respective different speed ratios, and the shift control apparatus disclosed in the above-identified Instruction Manual is arranged to restrict or inhibit a shift-up action of the automatic transmission to the highest-speed forward-drive position, for example, to the fifth-speed position having a speed ratio of 0.753, during the uphill running of the vehicle. In this case, the fourth-speed position having a speed ratio of 1.000, for example, is used in place of the fifth-speed position. Since the fifth-speed and fourth-speed positions have a considerably large difference in the speed ratio, the use of the fourth-speed position in place of the fifth-speed position during the uphill running of the vehicle is also felt uncomfortable by the vehicle operator in respect of the vehicle acceleration and deceleration characteristics. Further, the restriction of the shift-up action of the automatic transmission to the highest-speed position has a high risk of deterioration of the fuel economy of the vehicle.

SUMMARY OF THE INVENTION

The present invention was made in view of the background discussed above. It is therefore an object of the present invention to provide a shift control apparatus for a step-variable automatic transmission for a vehicle wherein the automatic transmission has a plurality of selectable groups of forward-drive positions having respective different sets of speed ratios, the shift control apparatus being arranged to suitably select one of the groups of forward-drive positions of the automatic transmission, which enables the vehicle to be driven with an adequate drive force with the automatic transmission placed in a relatively high-speed forward-drive position, for thereby restricting the frequent shifting actions of the automatic transmission and improving the drivability of the vehicle while reducing the deterioration of fuel economy of the vehicle.

The object indicated above may be achieved according to the principle of this invention, which provides a shift control apparatus for controlling shifting actions of a step-variable automatic transmission for a vehicle, which has a plurality of selectable groups of forward-drive positions having respective different sets of speed ratios, each one of said plurality of selectable groups of forward-drive positions including at least one high-speed position each having a speed ratio which is different from that of each high-speed position of any other of said plurality of selectable groups, the shift control apparatus comprising:

a drive-force-increase determining portion operable to determine whether it is necessary to increase a drive force of the vehicle with said automatic transmission placed in one of said at least one high-speed position; and a drive-position-group selecting portion operable to select one of said plurality of selectable groups of forward-drive positions which includes said at least one high-speed position each having the speed ratio higher than that of each high-speed position of any other of said plurality of selectable groups, when said drive-force-increase determining portion has determined that it is necessary to increase the drive force of the vehicle with said automatic transmission placed in one of the at least one high-speed position.

The shift control apparatus of the present invention described above is arranged to control the shifting actions of an automatic transmission having a plurality of selectable groups of forward-drive positions each group including at least one high-speed position each having a speed ratio which is different from that of each high-speed position of any other of the selectable groups. In the present shift control apparatus, the drive-force-increase determining portion determines whether the vehicle drive force is required to be increased with the automatic transmission placed in one of the at least one high-speed position, and when this drive-force-increase determining portion has determined that the vehicle drive force is required to be increased, the drive-position-group selecting portion selects one of the selectable groups, which one group include the at least one high-speed position each having the speed ratio higher than that of each high-speed position of any other of the selectable groups. Accordingly, the vehicle can be driven with a sufficient drive force and a high degree of accelerating and decelerating drivability, while preventing or restricting frequent shifting actions of the automatic transmission and improving the fuel economy of the vehicle.

According to a first preferred form of the shift control apparatus of this invention, the drive-force-increase determining portion determines that it is necessary to increase the drive force of the vehicle, when the vehicle is in a condition that causes frequent shifting actions of the automatic transmission.

In the shift control apparatus according to the first preferred form of the invention, the drive-force-increase determining portion determines that it is necessary to increase the vehicle drive force, when the vehicle is in a condition that causes frequent shifting actions of the transmission 10, for example, when the frequent shifting actions are actually detected or expected to take place in the near future. Accordingly, the vehicle can be driven with an adequate drive force, while preventing or restricting the frequent shifting actions of the transmission.

According to a second preferred form of the shift control apparatus of the present invention, the drive-force-increase determining portion includes an uphill road determining portion operable to determine whether the vehicle is running on an uphill roadway, and the drive-force-increase determining portion determines that it is necessary to increase the drive force of the vehicle, when the uphill road determining portion has determined that the vehicle is running on the uphill roadway.

In the shift control apparatus according to the second preferred form of the invention, the drive-force-increase determining portion determines that the vehicle drive force is required to be increased, when the uphill road determining portion has determined that the vehicle is running on an uphill roadway. Accordingly, the vehicle can be driven with a sufficient drive force on an uphill roadway.

According to a third preferred form of the shift control apparatus of the invention, the drive-force-increase determining portion includes an uphill road determining portion operable to determine a position of the vehicle and determine, on the basis of the determined position of the vehicle, whether the vehicle is running or going to run on an uphill roadway, and the drive-force-increase determining portion determines that it is necessary to increase the drive force of the vehicle, when the uphill road determining portion has determined that the vehicle is running or going to run on the uphill roadway.

In the shift control apparatus according to the third preferred form of the invention, the drive-force-increase determining portion determines that the vehicle drive force is required to be increased, when the uphill road determining portion has determined that the vehicle is running or going to run on an uphill roadway, on the basis of the vehicle position represented by suitably obtained vehicle position information. Accordingly, the vehicle can be driven with a sufficient drive force on an uphill roadway.

According to a fourth preferred form of the shift control apparatus of this invention, the uphill road determining portion is operable to determine whether the vehicle is running on the uphill roadway, on the basis of a detected running speed of the vehicle and a detected acceleration value of the vehicle.

In the shift control apparatus according to the fourth preferred form of the invention, the uphill road determining portion is arranged to effect the determination as to whether the vehicle is running on the uphill roadway, on the basis of the detected running speed and acceleration value of the vehicle. Accordingly, the vehicle can be driven with a sufficient drive force on the uphill roadway.

According to a fifth preferred form of the shift control apparatus of this invention, the drive-force-increase determining portion includes a tracing control determining portion operable to determine whether the vehicle in question is under a tracing control to trace a preceding vehicle running in from of the vehicle in question, and the drive-force-increase determining portion determines that it is necessary to increase the drive force of the vehicle, when the tracing control determining portion has determined that the vehicle in question is under the tracing control.

In the shift control apparatus according to the fifth preferred form of the invention, the drive-force-increase determining portion determines that it is necessary to increase the vehicle drive force, when the tracing control determining portion 110 (S2) has determined that the vehicle is under the tracing control so as to trace the preceding vehicle. Accordingly, the vehicle can be driven with an adequate drive force and with a high degree of vehicle accelerating and decelerating drivability, so as to trace the preceding vehicle, while preventing or restricting frequent shift-up and shift-down actions of the transmission. In the conventional tracing control, the vehicle is repeatedly and alternately accelerated and decelerated with alternate shift-down and shift-up actions of the automatic transmission, so as to maintain a predetermined distance between the vehicle in question and the preceding vehicle. In the present shift control apparatus, however, the drive-position-group selecting portion selects one of the selectable groups of forward-drive positions which provides a larger drive force, thereby preventing the frequent shifting actions of the automatic transmission, which would take place during the tracing control of the vehicle.

According to a sixth preferred form of the shift control apparatus of this invention, the vehicle comprises a vehicle-to-vehicle distance sensor operable to detect a distance between the vehicle and the preceding vehicle, and the tracing control is effected to control a running speed of the vehicle such that the distance detected by the vehicle-to-vehicle distance sensor is maintained at a predetermined value, so that the vehicle traces the preceding vehicle.

The shift control apparatus according to the sixth preferred form of the invention permits the vehicle to be driven with a sufficient drive force and a high degree of vehicle accelerating and decelerating drivability, while preventing or restricting frequent shifting actions of the transmission, even when the vehicle is under the tracing control wherein the vehicle speed is controlled such that the distance between the vehicle in question and the preceding vehicle, which is detected by the vehicle-to-vehicle distance sensor provided on the vehicle, is maintained at a predetermined value.

According to a seventh preferred form of the shift control apparatus of this invention, the drive-force-increase determining portion includes a vehicle weight determining portion operable to determine whether a total weight of the vehicle is larger than a predetermined threshold value, and the drive-force-increase determining portion determines that it is necessary to increase the drive force of the vehicle, when the vehicle weight determining portion has determined that the total weight of the vehicle is larger than the predetermined threshold value.

In the shift control apparatus according to the seventh preferred form of the invention, the drive-force-increase determining portion determines that the vehicle drive force is required to be increased, when the vehicle weight determining portion has determined that the total vehicle weight is larger than the predetermined threshold value. Accordingly, the vehicle can be driven with a sufficient drive force even when the vehicle load is relatively large.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which:

FIG. 14 is a view indicating the forward-drive positions of the normal-spread and narrow-spread groups of the automatic transmission of the first embodiment, and of the normal-spread and wide-spread groups of the automatic transmission of the second embodiment, which forward-drive positions are available when the manually operable shifting device is placed in each of its operating positions;

FIG. 18 is a view indicating a relationship between the operating positions of the automatic transmission of FIG. 17 and respective combinations of operating states of hydraulically operated frictional coupling devices, when a first normal-spread group of operating positions is selected;

DETAILED DESCRIPTION OF THE PREFERRED EMBODIMENTS

Figure 1:
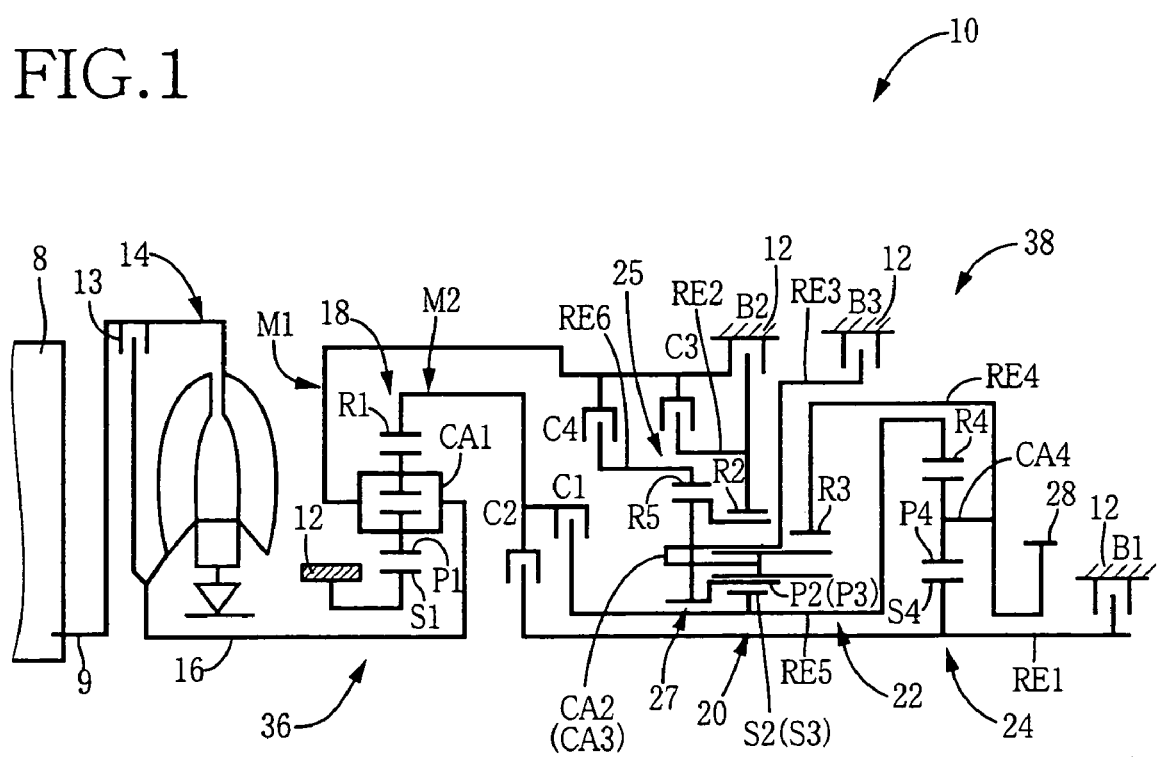
FIG. 1 is a schematic view illustrating a basic arrangement of a planetary gear type multiple-step automatic transmission for a vehicle, which is constructed according to a first embodiment of the present invention.

Referring to first to the schematic view of FIG. 1, there is illustrated a basic arrangement of a step-variable automatic transmission in the form of a planetary gear type multiple-step automatic transmission 10 for a motor vehicle, which is constructed according to the first embodiment of this invention. The automatic transmission 10 (hereinafter referred to simply as "transmission 10") has a plurality of operating positions which are selectively established, so that the speed ratio of the transmission 10 is changeable in steps. As shown in FIG. 1, the transmission 10 includes a fluid-operated power transmitting device in the form of a torque converter 14 with a lock-up clutch 13 incorporated therein, an input shaft 16 connected to the torque converter 14, a first shifting portion 36, a second shifting portion 38, and an output gear 28, which are disposed coaxially with each other, within a transmission casing 12 attached to the body of the vehicle. The first shifting portion 36 is constituted principally by a first planetary gear set 18, while the second shifting portion 38 is constituted principally by a second planetary gear set 20, a third planetary gear set 22, a fourth planetary gear set 24 and a fifth planetary gear set 25. The present transmission 10 is arranged to be suitably used for a longitudinal front-engine rear-drive vehicle (FR vehicle) or a transverse front-engine front drive vehicle (FF vehicle), and is interposed between a drive power source in the form of an engine 8, for example, and drive wheels of the vehicle, such that an output of the engine 8 is transmitted to the drive wheels through the transmission 10. In the present embodiment, the input shaft 16 and output gear 28 serve as an input member and an output member of the transmission 10, respectively, while the transmission casing 12 serves as a non-rotatable or stationary member. The torque converter 14 is operatively connected to a crankshaft 9 of the engine 8, so that the output of the engine 8 is transmitted to the input shaft 16 through the torque converter 14. Described in detail, the input shaft 16 is connected to a rotary output member of the torque converter 14 in the form of a turbine shaft which is rotated by the engine 8. Thus, the turbine shaft also serves as the input rotary member of the transmission 10. The output gear 28 is operatively connected to the right and left drive wheels through a differential gear device. Since the transmission 10 is constructed symmetrically with respect to its axis, the lower half of the transmission 10 located below the axis is omitted in the schematic view of FIG. 1. This omission also applies to automatic transmissions according to the other embodiments which will be described.

The first planetary gear set 18 of the first shifting portion 36 is a planetary gear device of a double-pinion type having a first sun gear S1, a plurality of pairs of first planetary gears P1 meshing with each other, a first carrier CA1 supporting the first planetary gears P1 such that each first planetary gear P1 is rotatable about its axis and rotatable about the axis of the first sun gear S1, and a first ring gear R1 meshing with the first sun gear S1 through the first planetary gears P1. The first planetary gear set 18 has a gear ratio ρ1 of about 0.427, for example. The first shifting portion 36 transmits a rotary motion of the input rotary member in the form of the input shaft 16 to the second shifting portion 38 through two output paths in the form of a first intermediate output path M1, and a second intermediate output path M2 a rotating speed of which is reduced with respect to that of the first intermediate output path M1. The first carrier CA1 functions as a first intermediate output member of the first shifting portion 36, and is connected to the input shaft 16 and the first intermediate output path M1. The first sun gear S1 is fixed to the transmission casing 12 and is not rotatable. The first ring gear R1 functions as a second intermediate output member of the first shifting portion 36, and is connected to the second intermediate output path M2. Although the first shifting portion 36 in the present first embodiment is arranged such that the first intermediate output path M1 is connected to the input shaft 16 and is rotated with the input shaft 16, the first intermediate output path M1 need not be connected to the input shaft 16.

The second planetary gear set 20 and the fourth planetary gear set 24 of the second shifting portion 38 are planetary gear devices of a single-pinion type, while the third planetary gear set 22 of the second shifting portion 38 is a planetary gear device of a double-pinion type. The second planetary gear set 20 has a second sun gear S2, a second planetary gear P2, a second carrier CA2 supporting the second planetary gear P2 such that the second planetary gear P2 is rotatable about its axis and rotatable about the axis of the second sun gear S2, and a second ring gear R2 meshing with the second sun gear S2 through the second planetary gear P2. The second planetary gear set 20 has a gear ratio of ρ2 of about 0.349, for example. The third planetary gear set 22 has a third sun gear S3, a plurality of pairs of third planetary gears P3 meshing with each other, a third carrier CA3 supporting the third planetary gears P3 such that each third planetary gear P3 is rotatable about its axis and rotatable about the axis of the third sun gear S3, and a third ring gear R3 meshing with the third sun gear S3 through the third planetary gears P3. The third planetary gear set 22 has a gear ratio ρ3 of about 0.419, for example. The fourth planetary gear set 24 has a fourth sun gear S4, a fourth planetary gear P4, a fourth carrier CA4 supporting the fourth planetary gear P4 such that the fourth planetary gear P4 is rotatable about its axis and rotatable about the axis of the fourth sun gear S4, and a fourth ring gear R4 meshing with the fourth sun gear S4 through the fourth planetary gear P4. The fourth planetary gear set 24 has a gear ratio ρ4 of about 0.301, for example. The second planetary gear P2 is a stepped pinion which includes a small-diameter gear portion meshing with the second sun gear S2 and the second ring gear R2, and a large-diameter gear portion 27 that meshes with a fifth ring gear R5 of the fifth planetary gear set 25. The fifth planetary gear set 25 has a gear ratio ρ5 of about 0.262, for example. However, the second planetary gear P2 may be a non-stepped pinion having only the gear portion 27 functioning as a fifth planetary gear P5 of the fifth planetary gear set 25. In this modified arrangement of the second shifting portion 38, the fifth planetary gear set 25 has a fifth sun gear S5, the above-indicated fifth planetary gear P5, a fifth carrier CA5 supporting the fifth planetary gar P5 such that the fifth planetary gear P3 is rotatable about its axis and rotatable about the axis of the fifth sun gear S5, and a fifth ring gear R5 meshing with the fifth sun gear S5 through the fifth planetary gear P5. Where the numbers of teeth of the first sun gear S1, first ring gear R1, second sun gear S2, second ring gear R2, third sun gear S3, third ring gear R3, fourth sun gear S4, fourth ring gear R4, fifth sun gear S5 and fifth ring gear R5 are represented by $Z_{S1}$, $Z_{R1}$, $Z_{S2}$, $Z_{R2}$, $Z_{S3}$, $Z_{R3}$, $Z_{S4}$, $Z_{R4}$, $Z_{S5}$ and $Z_{R5}$, respectively, the above-indicated gear ratios ρ1, ρ2, ρ3, ρ4 and 5 are represented by $Z_{S1}/Z_{R1}$, $Z_{S2}/Z_{R2}$, $Z_{S3}/Z_{R3}$, $Z_{S4}/Z_{R4}$, and $Z_{S5}/Z_{R5}$, respectively.

The second and third planetary gear sets 20, 22 are arranged such that the second carrier CA2 and the third carrier CA3 are constituted by a single common component, and the second sun gear S3 and the third sun gear S3 are constituted by a single common component, while the second planetary gear P2 also functions as one of the two meshing third planetary gears P3. Each of the single common components indicated above may be two separate components.

In the second shifting portion 38, the fourth sun gear S4 is selectively connected through a second clutch C2 to the second intermediate output path M2, that is, to the first ring gear R1 functioning as the second intermediate output member, and is selectively fixed by a first brake B1 to the transmission casing 12 serving as the non-rotatable or stationary member. The second ring gear R2 is selectively connected by a third clutch C3 to the first intermediate output path M1, that is, to the first carrier CA1 functioning as the first intermediate output member, and is selectively fixed by a second brake B2 to the transmission casing 12. The second and third carriers CA2, CA3 integrally connected to each other are selectively fixed by a third brake B3 to the transmission casing 12, and the third ring gear R3 and fourth carrier CA4 integrally connected to each other are connected to the output rotary member in the form of the output gear 28. The second and third sun gears S2, S3 and fourth ring gear R4 that are integrally connected to each other are selectively connected through a first clutch C1 to the first ring gear R1 functioning as the second intermediate output member, and the fifth ring gear R5 is selectively connected through a fourth clutch C4 to the first carrier CA1 functioning as the first intermediate output member.

The first, second, third and fourth clutches C1–C4 and the first, second and third brakes B1–B3 are all hydraulically operated frictional coupling devices widely used in known step-variable automatic transmissions, multiple-disc type frictional coupling devices. For instance, each of those clutches may be a wet-type multiple-disc clutch having a plurality of friction plates which are superposed on each other and forced against each other by a hydraulic actuator, each of those brakes may be a band brake having one band or two bands each of which is wound on the outer circumferential surface of a rotary drum and tightened at its one end by a hydraulic actuator. The brakes B1–B3 are selectively engaged to fix the corresponding rotary elements to the transmission casing 12.

Figures 2, 3:
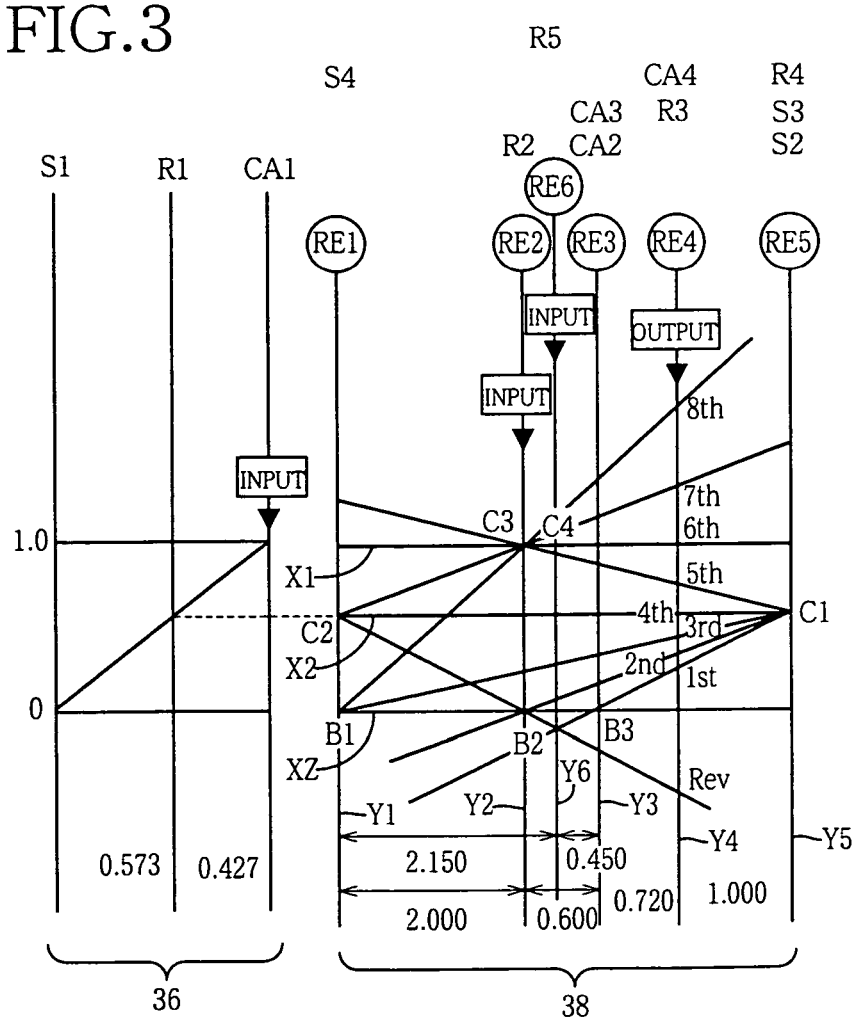
FIG. 2 is a view indicating a relationship between the operating positions of the automatic transmission of FIG. 1 and respective combinations of operating states of hydraulically operated frictional coupling devices, when a normal-spread group of operating positions is selected.
FIG. 3 is a collinear chart showing an operation of the automatic transmission of FIG. 1 when the normal-spread group of operating positions is selected.

In the transmission 10 constructed as described above, a selected one of eight forward-drive positions and a rear-drive position (Rev) is established by simultaneous engaging actions of a corresponding combination of two frictional coupling devices selected from the first through fourth clutches C1–C4 and first, second and third brakes B1–B3, as shown in FIG. 2. The seven forward-drive positions consist of a first-speed position (1st), a second-speed position (2nd), a third-speed position (3rd), a fourth-speed position (4th), a fifth-speed position (5th), a sixth-speed position (6th), a seventh-speed position (7th) and an eighth-speed position (8th), which have respective speed ratios $\gamma 1$–$\gamma 8$ that change as geometric series. The gear ratio $\gamma$ is equal to $N_{IN}/N_{OUT}$, where $N_{IN}$ and $N_{OUT}$ represent rotating speeds of the input shaft 16 and the output gear 28, respectively.

As shown in FIG. 2, the first-speed position (1st) having the highest speed ratio $\gamma 1$ of about 4.169, for example, is established by engaging actions of the first clutch C1 and the third brake B3. The second-speed position (2nd) having the speed ratio $\gamma 2$ of about 3.067, for example, which is lower than that of the first-speed position, is established by engaging actions of the first clutch C1 and the second brake B2. The third-speed position (3rd) having the speed ratio $\gamma 3$ of about 2.271, for example, which is lower than that of the second-speed position, is established by engaging actions of the first clutch C1 and the first brake B1. The fourth-speed position (4th) having the speed ratio $\gamma 4$ of about 1.745, for example, which is lower than that of the third-speed position, is established by engaging actions of the first and second clutches C1 and C2. The fifth-speed position (5th) having the speed ratio $\gamma 5$ of about 1.321, for example, which is lower than that of the fourth-speed position, is established by engaging actions of the first and third clutches C1 and C3. The sixth-speed position (6th) having the speed ratio $\gamma 6$ of about 1.000, for example, which is lower than that of the fifth-speed position, is established by engaging actions of the third and fourth clutches C3 and C4. The seventh-speed position (7th) having the speed ratio $\gamma 7$ of about 0.780, for example, which is lower than that of the sixth-speed position, is established by engaging actions of the second and third clutches C2 and C3. The eighth-speed position (8th) having the speed ratio $\gamma 8$ of about 0.602, for example, which is lower than that of the seventh-speed position, is established by engaging actions of the third clutch C3 and the first brake B1.

The rear-drive position having a speed ratio $\gamma_R$ of 2.644, for example, which is intermediate between those of the second- and third-speed positions, is established by engaging actions of the second clutch C2 and the second brake B2. The first-speed through eighth-speed positions (1st through 8th) indicated in FIG. 2 constitute a normal-spread group of forward-drive positions having a set of speed ratios $\gamma 1$–$\gamma 8$. The speed ratios $\rho 1$–$\rho 5$ of the first through fifth planetary gear sets 18, 20, 22, 24, 25 are determined to establish the above-indicated speed ratios $\gamma 1$–$\gamma 8$ and $\gamma_R$ of the nine operating positions (1st trough 8th, and Rev).

In the specific example of FIG. 2, stepping ratios of the adjacent forward-drive positions of the normal-spread group of the transmission 10, and an overall speed ratio range ("spread") of the normal-spread group of eight forward-drive positions are determined as described below. Namely, the stepping ratio ($\gamma 1/\gamma 2$) which is a ratio of the speed ratio $\gamma 1$ of the first-speed position to the speed ratio $\gamma 2$ of the second-speed position is 1.359, and the stepping ratio ($\gamma 2/\gamma 3$) which is a ratio of the speed ratio $\gamma 2$ of the second-speed position to the speed ratio $\gamma 3$ of the third-speed position is 1.351. The stepping ratio ($\gamma 3/\gamma 4$) which is a ratio of the speed ratio $\gamma 3$ of the third-speed position to the speed ratio $\gamma 4$ of the fourth-speed position is 1.301. The stepping ratio ($\gamma 4/\gamma 5$) which is a ratio of the speed ratio $\gamma 4$ of the fourth-speed position to the speed ratio $\gamma 5$ of the fifth-speed position is 1.321. The stepping ratio ($\gamma 5/\gamma 6$) which is a ratio of the speed ratio $\gamma 5$ of the fifth-speed position to the speed ratio $\gamma 6$ of the sixth-speed position is also 1.321. The stepping ratio ($\gamma 6/\gamma 7$) which is a ratio of the speed ratio $\gamma 6$ of the sixth-speed position to the speed ratio $\gamma 7$ of the seventh-speed position is 1.282, and the stepping ratio ($\gamma 7/\gamma 8$) which is a ratio of the speed ratio $\gamma 7$ of the seventh-speed position to the speed ratio $\gamma 8$ of the eighth-speed position is 1.295. Thus, the speed ratios $\gamma 1$–$\gamma 8$ change as the geometric series. As described above, the overall speed ratio range or "spread" $=\gamma 1/\gamma 8=4.169/0.602$) of the normal-spread group of eight forward-drive positions is as wide as about 6.921.

The collinear chart of FIG. 3 indicates, by straight lines, a relationship among the rotating speeds of the rotary elements the rotary elements of the first and second shifting portions 36, 38 when the transmission 10 is placed in each of its operating positions. The collinear chart of FIG. 3 is a two-dimensional coordinate system which has a horizontal axis and a vertical axis and in which the gear ratios $\rho 1$–$\rho 5$ of the first through fifth planetary gear sets 18, 20, 22, 24, 25 are taken along the horizontal axis, while the relative rotating speeds of the rotary elements are taken along the vertical axis. A lowermost one of three horizontal straight lines X1, X2, XZ, that is, the horizontal straight line XZ indicates the rotating speed of "0", while an uppermost one of the three horizontal lines X1, X2, XZ, that is, the horizontal straight line X1 indicates the rotating speed corresponding to the speed ratio of 1.0, that is, the rotating speed of the first intermediate output path M1. The intermediate horizontal straight line X2 between the two horizontal straight lines X1, XZ indicates the rotating speed N×2 of the second intermediate output path M2, which is lower than the rotating speed of the first intermediate output path M1 by an amount corresponding to the gear ratio $\rho 1$ of the first planetary gear set 18. First three vertical straight lines as counted from the left end of the collinear chart of FIG. 3 correspond to the first sun gear S1, first ring gear R1 and first carrier CA1 of the first planetary gear set 18 of the first shifting portion 36, respectively, and the distances between the adjacent ones of those three vertical straight lines are determined by the gear ratio $\rho 1$ of the first planetary gear set 18. Six vertical straight lines Y1–Y6 on the right side of the above-indicated three vertical straight lines respectively correspond to a first rotary element RE1 in the form of the fourth sun gear S4, a second rotary element RE2 in the form of the second ring gear R2, a third rotary element RE3 in the form of the second and third carriers CA2 and CA3 connected to each other, a fourth rotary element RE4 in the form of the third ring gear R3 and fourth carrier CA4 connected to each other, a fifth rotary element RE5 in the form of the second and third sun gears S2, S3 and fourth ring gear R4 connected to each other, and a sixth rotary element RE6 in the form of the fifth ring gear R5. The vertical straight line Y6 is located between the vertical straight lines Y2 and Y3. The distances between the adjacent ones of the vertical straight lines Y1–Y6 are determined by the gear ratios $\rho 2$–$\rho 5$ of the second, third, fourth and fifth planetary gear sets 20, 22, 24, 25. In general, the distance between the vertical straight line for each sun gear and the vertical straight line for the corresponding carrier corresponds to "1", while the distance between the vertical straight line for each carrier and the vertical straight line for the corresponding ring gear corresponds to the corresponding gear ratio ρ. In the collinear chart of FIG. 3, the distance between the vertical straight lines Y4 and Y5 corresponds to "1", while the distances between the other adjacent vertical straight lines Y1–Y4, Y6 (Y1 and Y2; Y2 and Y6; Y6 and Y3; and Y3 and Y4) are determined on the basis of the distance between the vertical straight lines Y4 and Y5 and the gear ratios ρ2–ρ5.

Referring to the collinear chart of FIG. 3, the arrangement of the present transmission 10 will be described in further detail. In the first shifting portion 36, the first carrier CA1 which is one of the three rotary elements of the first planetary gear set 18 is connected to the input shaft 16 (input rotary member) and the first intermediate output path M1, and the first sun gear S1 which is another of the three rotary elements is non-rotatably fixed to the transmission casing 12 (non-rotatable member), while the first ring gear R1 which is the third rotary element is connected to the second intermediate output path M2, so that the rotary motion of the input shaft 16 is transmitted to the second shifting portion 38 through the first intermediate output path M1, and the second intermediate output path M2 the rotating speed of which is reduced with respect to that of the first intermediate output path M1. In the second shifting portion 38, the first rotary element RE1 in the form of the fourth sun gear S4 is selectively connected through the second clutch C2 to the first ring gear R1 (second intermediate output path M2), and is selectively fixed by the first brake B1 to the transmission casing 12, and the second rotary element RE2 in the form of the second ring gear R2 is selectively connected through the third clutch C3 to the first carrier CA1 (first intermediate output path M1), and is selectively fixed by the brake B2 to the transmission casing 12. The third rotary element RE3 in the form of the second and third carriers CA2, CA3 is selectively fixed by the third brake B3 to the transmission casing 12, and the fourth rotary element RE4 in the form of the third ring gear R3 and the fourth carrier CA4 is connected to the output gear 28. The fifth rotary element RE5 in the form of the second and third sun gears S2, S3 and fourth ring gear R4 is selectively connected through the first clutch C1 to the first ring gear R1, and the sixth rotary element RE6 in the form of the fifth ring gear R5 is selectively connected through the fourth clutch C4 to the first carrier CA1.

As is apparent from the collinear chart of FIG. 3, a selected one of the nine operating positions (1st through 8th and Rev) of the transmission 10 is established by simultaneous engaging actions of the corresponding combination of two frictional coupling devices selected from among the first clutch C1, second clutch C2, third clutch C3, fourth clutch C4, first brake B1, second brake B2 and third brake B3, so that the corresponding rotary elements selected from the first through sixth rotary elements RE1–RE6 are connected to the first intermediate output path M1, for rotation at a speed corresponding to the speed ratio of 1.0, or connected to the second intermediate output path M2, for rotation at the speed N×2, or fixed to the transmission casing 12 and held stationary. The rotating speeds of the output gear 28 when the transmission 10 is placed in the nine operating positions ($1^{st}$-speed through $8^{th}$-speed positions, and rear-drive position Rev) are indicated along the vertical straight line Y4. In the first-speed position, for example, the fifth rotary element RE5 is connected through the engaged first clutch C1 to the second intermediate output path M2, and is rotated at the speed N×2, while the third rotary element RE3 is fixed by the engaged third brake B3 to the transmission casing 12 and is held stationary. In this case, the rotating speed of the output gear 28 is represented by a point of intersection of the vertical straight line Y4 and an inclined straight line which connects a point of intersection (indicated at "1st" in FIG. 3) between the vertical straight line Y4 and the horizontal straight line X2 and a point of intersection between the vertical straight line Y3 and the horizontal straight line XZ.

Figures 4, 5:
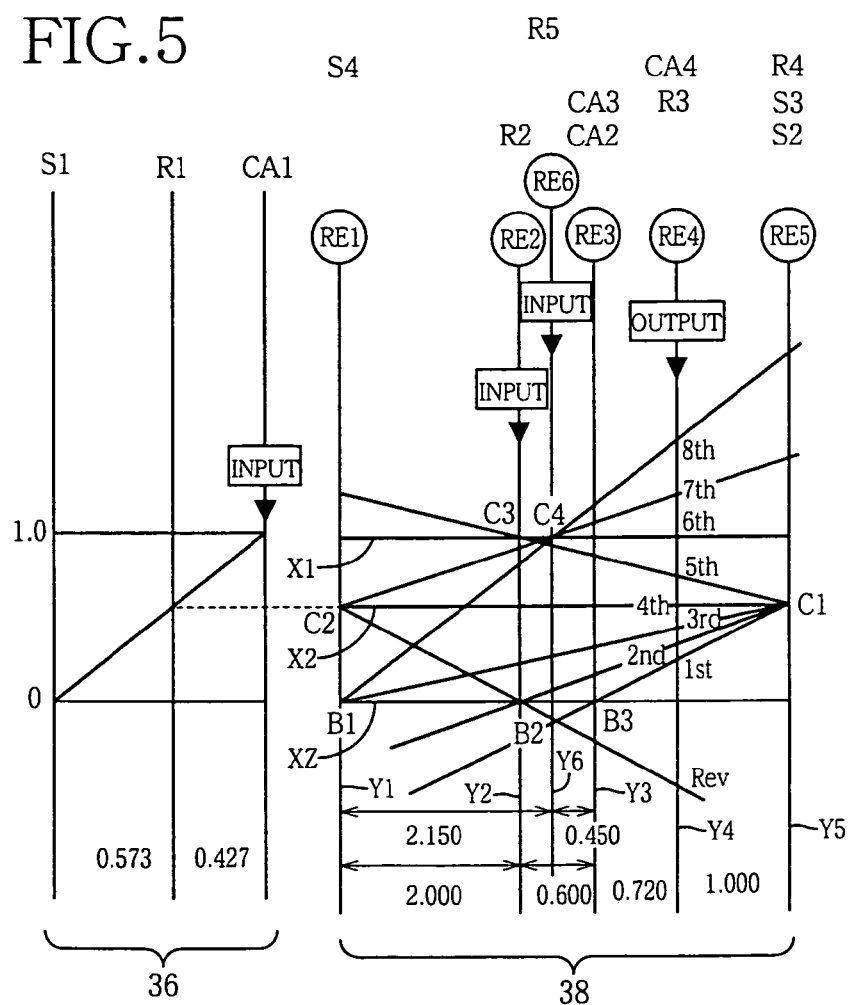
FIG. 4 is a view indicating a relationship between the operating positions of the automatic transmission of FIG. 1 and respective combinations of operating states of the hydraulically operated frictional coupling devices, when a narrow group of operating positions is selected.
FIG. 5 is a collinear chart showing an operation of the automatic transmission of FIG. 1 when the narrow-spread group of operating positions of the automatic transmission is selected.

As described above, the first-speed through eighth-speed positions (1st through 8th) indicated in FIG. 2 constitute the normal-spread group of forward-drive positions which has the set of speed ratios γ1–γ8 and a relatively wide overall speed ratio range or spread. Of the speed ratios of these eight forward-drive positions, the speed ratios γ7 and γ8 of the seventh-speed and eighth-speed positions ($7^{th}$ and 8th) are lower than 1.0. That is, the rotating speeds of the output gear 28 when the transmission 10 is placed in the seventh-speed and eighth-speed positions are higher than the rotating speed of the input shaft 16. These seventh-speed and eighth-speed positions are established by engaging the third clutch C3 as well as the second clutch C2 and the first brake B1, respectively. The present transmission 10 has a narrow-spread group of nine operating positions wherein the seventh-speed and eighth-speed positions "7th" and "8th" are established by engaging the fourth clutch C4 in place of the third clutch C3, as well as the second clutch C2 and the first brake B1, respectively, as indicated in FIGS. 4 and 5, so that the sixth rotary element RM6 is connected to the first intermediate output path M1, for rotation at the speed corresponding to the speed ratio of 1.0. The speed ratios of these seventh-speed and eighth-speed positions of the narrow-spread group of operating positions of FIG. 4, which are established by engaging the fourth clutch C4, are higher than those of the normal-spread group of operating positions of FIG. 2, which are established by engaging the third clutch C3, and are determined by the position of the sixth rotary element RM6 (ring gear R5) in the direction parallel to the horizontal axis of the collinear chart of FIG. 5. That is, the speed ratios of the seventh-speed and eighth-speed positions of the narrow-spread group are determined by a gear ratio ρ5 of the fifth planetary gear set 25.

The narrow-spread group of operating positions indicated in FIGS. 4 and 5 is different from the normal-spread group of operating positions indicated in FIGS. 2 and 3, only in the combinations of the two frictional coupling devices to be engaged to establish the seventh-speed and eighth-speed positions and in the speed ratios of these two forward-drive positions. Namely, the seventh-speed position having a speed ratio γ7 of about 0.811, for example, is established by engaging the fourth clutch C4 as well as the second clutch C2, and the eighth-speed position having a speed ratio γ8 of about 0.648 is established by engaging the clutch C4 as well as the first brake B1. Since the speed ratios γ7 and γ8 of the seventh-speed and eighth-speed positions of the narrow-spread group are higher than those of the normal-spread group, the overall speed ratio range or spread (=γ1/γ8=6.433) of the narrow-spread group is accordingly narrower than that (6.921) of the normal-spread group. Accordingly, the transmission 10 placed in the seventh-speed or eighth-speed position of the narrow-spread group provides a larger drive torque than in the corresponding position of the normal-spread group. Therefore, the seventh-speed and eighth-speed positions of the narrow-spread group of forward-drive positions can be effectively used where a relatively large vehicle drive force is required during a running of the vehicle at a relatively high speed, for example: during a high-speed running on an uphill road; during a high-speed running with rapid acceleration of the vehicle to run ahead of a preceding vehicle in front of the vehicle in question;

during a tracing control such as a radar cruise control of the vehicle speed with acceleration and deceleration of the vehicle so as to maintain the vehicle speed at a predetermined value while maintaining a desired distance between the vehicle in question and the preceding vehicle; and during a running of the vehicle with a larger load (e.g., with a large number of passengers or occupants or a large cargo load). Thus, the transmission 10 has the normal-spread group of forward-drive positions of FIG. 2 and the narrow-spread group of forward-drive positions of FIG. 4.

Referring next to FIGS. 6–9, there will be described a second embodiment of this invention, which is a modification of the transmission 10 of the first embodiment of FIGS. 1–5.

The transmission 10 of the second embodiment is different from that of the first embodiment, only in that the fifth planetary gear set 25 has a gear ratio γρ5 of about 0.390 which is higher than that (0.262) in the first embodiment. The transmission 10 of the second embodiment has the normal-spread group of operating positions indicated in FIG. 6, which is the same as that of FIG. 2 of the first embodiment. Since the fifth planetary gear set 25 of the second shifting portion 38 has the gear ratio ρ5 of about 0.390, the vertical straight line Y6 corresponding to the sixth rotary element RE6 (fifth ring gear R5) is located between the vertical straight lines Y1 and Y2, as shown in the collinear chart of FIG. 7.

Figures 8, 9:
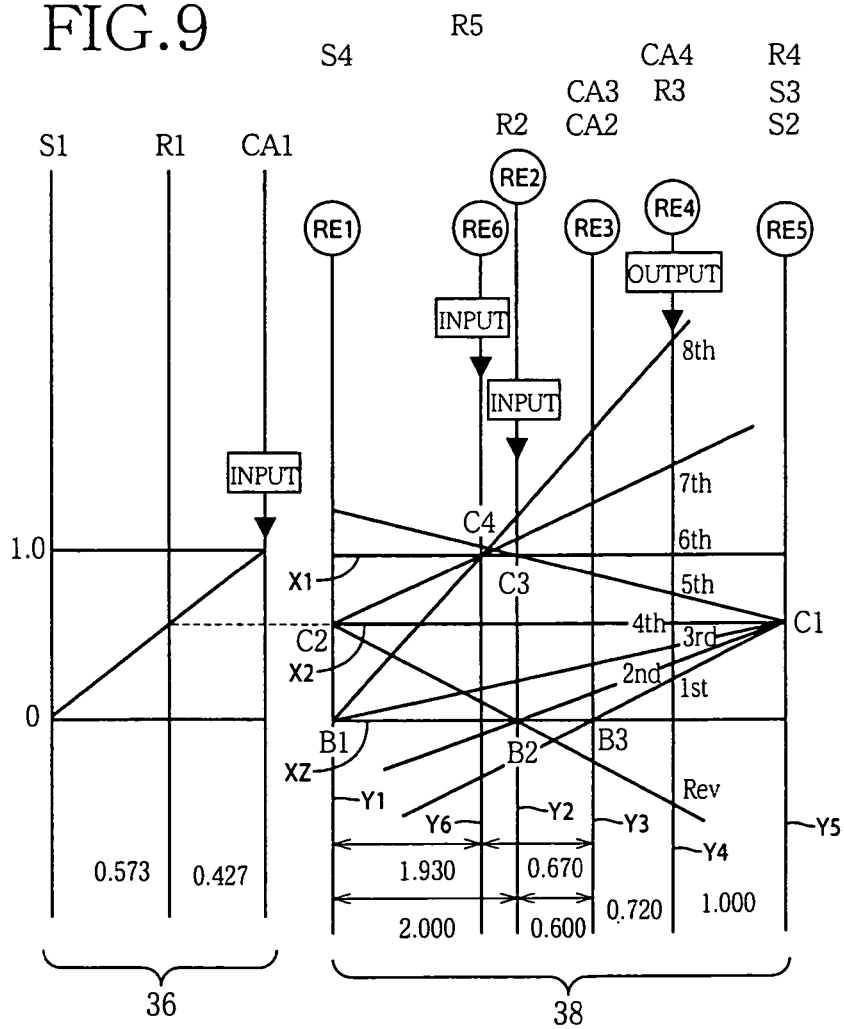
FIG. 8 is a view indicating a relationship between the operating positions of the automatic transmission of the second embodiment, and respective combinations of operating states of the frictional coupling devices, when a wide-spread group of operating positions is selected.
FIG. 9 is a collinear chart showing an operation of the automatic transmission of the second embodiment when the wide-spread group of operating positions is selected.

The transmission 10 of the second embodiment has a wide-spread group of nine operating positions, which includes the seventh-speed position established by engaging the fourth clutch C4 as well as the second clutch C2, and the eighth-speed position established by engaging the fourth clutch C4 as well as the first brake B1, as indicated in FIGS. 8 and 9. The other positions of the wide-spread group of operating positions of FIG. 8 are established by the same combinations of the frictional coupling devices as those of the normal-spread group of FIG. 6. As indicated in FIG. 8, the seventh-speed position established by the engaging actions of the second and fourth clutches C2, C4 has a speed ratio of about 0.765, and the eighth-speed position established by the engaging actions of the fourth clutch and the first brake B1 has a speed ratio of about 0.581. These speed ratios of the seventh-speed and eighth-speed positions of the wide-spread group are lower than those of the normal-spread group of FIG. 6. Accordingly, the wide-spread group of FIG. 8 has a wide overall speed ratio range or spread of about 7.175 (γ1/γ8) than that (6.921) of the normal-spread group of FIG. 6. The seventh-speed and eighth-speed positions of the wide-spread group can be effectively used for steady or economical running of the vehicle at a relatively high speed. When the seventh-speed or eighth-speed is established by engaging the fourth clutch C4, as indicated in the collinear chart of FIG. 9, the sixth rotary element RE6 is connected to the first intermediate output path M1, as described above with respect to the narrow-spread group of FIG. 4 by reference to the collinear chart of FIG. 5. Thus, the second embodiment is arranged such that the transmission 10 has the normal-spread group of forward-drive positions of FIG. 6 and the wide-spread group of forward-drive positions of FIG. 8.

Figure 10:
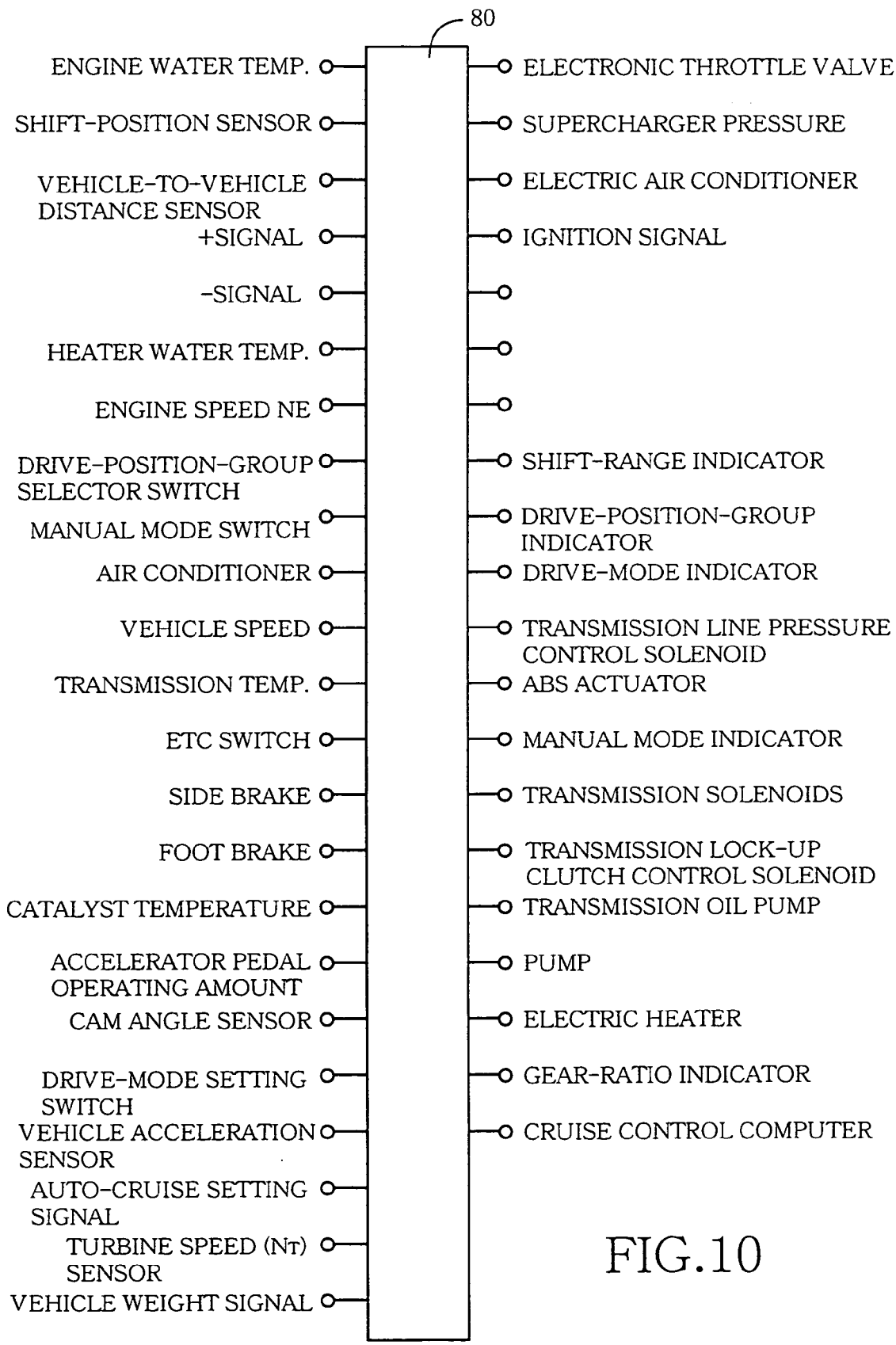
FIG. 10 is a block diagram illustrating inputs to and outputs from an electronic control device for the planetary gar type multiple-step automatic transmission of FIG. 1.
Figure 11:
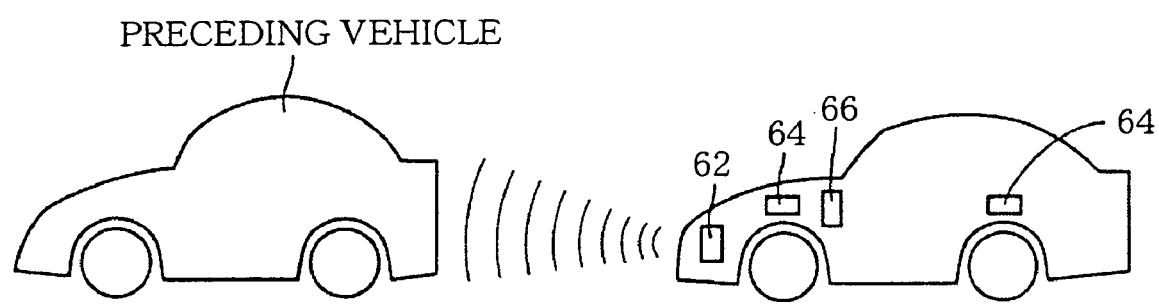
FIG. 11 is a view for explaining a tracing control such as a radar cruise control of the vehicle speed under the control of the electronic control device of FIG. 10, so as to trace a preceding vehicle.
Figure 15:
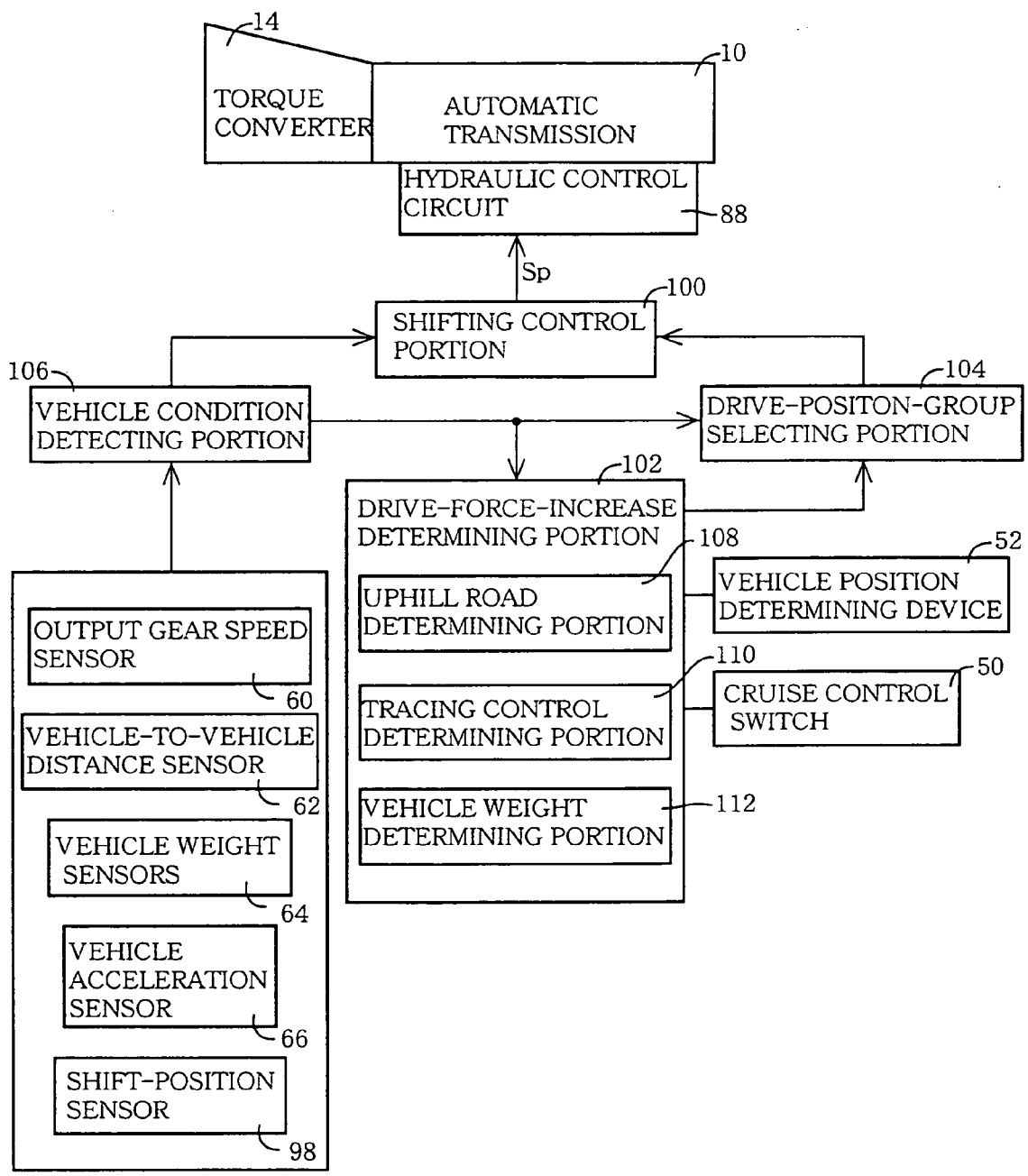
FIG. 15 is a block diagram illustrating major functional portions of the electronic control device of FIG. 10.

The automatic transmission 10 having the two groups of operating positions as described above is controlled by an electronic control device 80 which receives various input signals and generates various output signals, as illustrated in the block diagram of FIG. 10. The input signals include: a signal indicative of an operating amount Acc of an accelerator pedal detected by an accelerator sensor; a signal indicative of an opening angle $\theta_{TH}$ of the throttle valve detected by a throttle opening sensor; a signal indicative of the vehicle running speed V obtained from a rotating speed $N_{OUT}$ of the output gear 28 detected by an output gear seed sensor 60 (FIG. 15); a signal indicative of an operating speed NE of the engine 8 detected by an engine speed sensor; a signal indicative of a supercharger pressure Pa in an intake pipe of the engine 8; a signal indicative of a currently selected position $P_{SH}$ of a shift lever 92 (FIG. 13A) detected by a shift position sensor 98 (FIGS. 13A and 15); a signal indicative of an oil temperature $T_{OIL}$ of the working fluid of the transmission 10; a signal indicative of a distance between the vehicle in question and the preceding vehicle, which is detected by a vehicle-to-vehicle distance sensor 62 (FIGS. 11 and 15); a signal indicative of an overall weight of the vehicle (indicative of a passenger load of the vehicle) detected by vehicle weight sensors 64 (FIGS. 11 and 15); and a signal indicative of an acceleration value of the vehicle detected by a vehicle acceleration sensor 66 (FIGS. 11 and 15). The output signals include: a drive signal for driving a throttle actuator for controlling the throttle valve to establish its opening angle $\theta_{TH}$ according to the operating amount Acc of the accelerator pedal; signals S1, S2 and S3 for controlling solenoid coils of shift valves incorporated in a hydraulic control circuit 88 (FIG. 15) to shift the transmission 10; a signal $D_{SLT}$ for driving a linear solenoid valve SLT for controlling the line pressure used to control the engaging and releasing actions of the frictional coupling devices; a signal $D_{SLU}$ for driving a linear solenoid valve SLU for controlling the engaging and releasing actions (amount of slipping) of the lock-up clutch 13; a signal $D_{SLN}$ for driving a linear solenoid valve SLN for controlling the back pressure of an accumulator provided in the hydraulic control circuit 88.

The electronic control device 80 is principally constituted by a microcomputer incorporating a central processing unit (CPU), a read-only memory (ROM), a random-access memory (RAM), and an input/output interface. The CPU operates according to control programs stored in the ROM, while utilizing a temporary data storage function of the RAM, to effect various control operations such as: a throttle control operation to control the opening angle $\theta_{TH}$(%) of the throttle valve; a shift control operation to shift the transmission 10 in an automatic shifting mode or a manual shifting mode; an engine output control operation to control the output of the engine 8; a lock-up clutch control operation to control the lock-up clutch 13; a supercharger pressure control operation to control the supercharger pressure of the engine 8; an air/fuel ratio control operation to control the air/fuel ratio of the engine 8; and a tracing control operation to control the vehicle speed so as to trace the preceding vehicle. The engine output control operation is effected by controlling a throttle actuator to control the opening angle of the throttle valve, a fuel injector valve to control the amount of fuel injection into the engine 8, and an igniter to control the ignition timing of the engine 8, for example.

Figure 12:
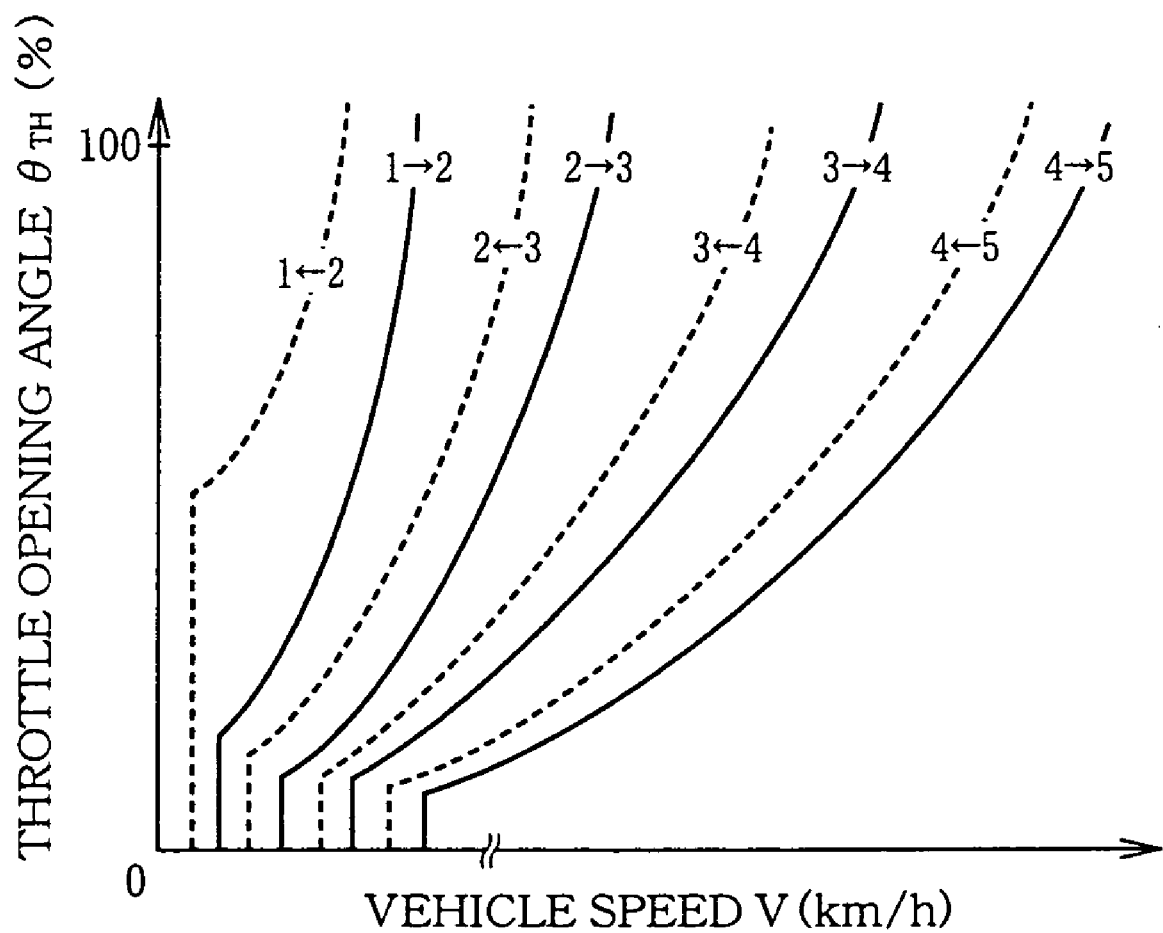
FIG. 12 is a graph indicating shift-up and shift-down boundary lines used by the electronic control device to shift the automatic transmission.

The tracing control operation is effected in cooperation with a so-called "cruise control", to control the running speed of the vehicle, with repeated alternate acceleration and deceleration of the vehicle, for example, such that a distance between the vehicle in question and the preceding vehicle, which is detected by the vehicle-to-vehicle sensor 62 as shown in FIG. 11, coincides with a predetermined value proportional to the vehicle running speed, so that the vehicle in question traces the preceding vehicle. The vehicle-to-vehicle distance sensor 62 to detect the distance between the two vehicles may use a laser radar, a millimeter wave or a ultrasonic or supersonic wave. The shift control operation to control the transmission 10 is effected by selecting one of the operating positions of the transmission 10 on the basis of the detected actual accelerator pedal operating amount Acc (%) or throttle opening angle $\theta_{TH}$ (%) and the detected actual vehicle speed V (km/h), and according to predetermined shift-up and shift-down boundary lines (collectively referred to as "shifting pattern"), as indicated in the graph of FIG. 12 by way of example, and controlling the solenoid-operated valves of the hydraulic control circuit 88 to control the frictional coupling devices C1–C4 and B1–B3, so as to establish the selected operating position of the transmission 10 in the automatic shifting mode, or to shift up or down the transmission 10 according to the currently selected position $P_{SH}$ of the shift lever 92 in the manual shifting mode. In the example of FIG. 12, each of the shift-up and shift-down boundary lines (for the first-speed through fifth-speed positions of the eight forward-drive positions) represents a relationship between the throttle opening angle $\theta_{th}$ (%) and the vehicle speed V. When a point defined by the presently detected throttle opening angle and vehicle speed moves from a point on one side of any shift-up or shift-down boundary line to a point on the other side of this boundary line, the transmission 10 is controlled to be shift up or down depending upon the boundary line in question.

Figure 13A:
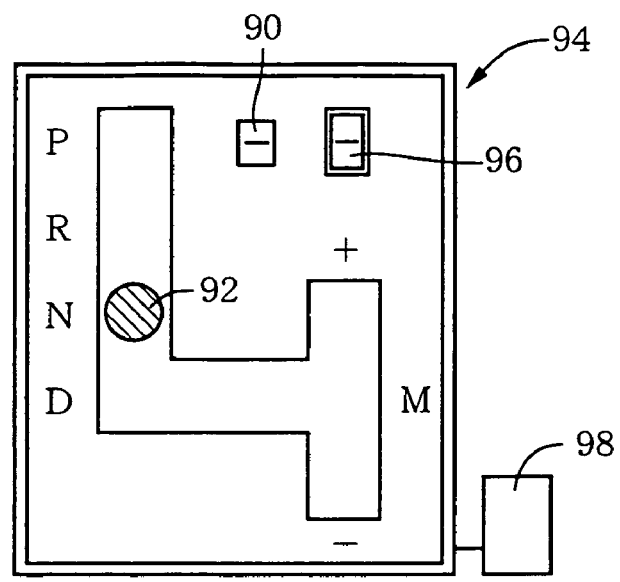
FIG. 13A is a view showing an example of a manually operable shifting device provided on the vehicle.

FIG. 13A shows a manually operable shifting device 94 which includes the above-indicated shift lever 92 and which is provided adjacent to the vehicle operator's seat. The shift lever 92 is movable to a selected one of its operating positions consisting of a parking position P in which the output gear 28 of the transmission 10 is locked; a reverse position R for driving the vehicle in the reverse direction with the transmission 10 placed in the rear-drive position (Rev); a neutral position N in which the transmission 10 is placed in its neutral state for inhibiting power transmission from the input shaft 16 to the output gear 28; an auto-shift position D for driving the vehicle in the forward direction with the transmission 10 placed in one of the forward-drive positions (first-speed position "1st" through the eighth-speed position "8th") which is selected in the automatic shifting mode; and a manual-shift position M for driving the vehicle in the forward direction with the transmission 10 shifted in the manual shifting mode. The parking and neutral positions P, N are non-drive positions in which the vehicle is not driven, and the reverse position R is a rear-drive position for driving the vehicle in the reverse direction, while the auto-shift and manual-shift positions D, M are forward-drive positions for driving the vehicle in the forward direction. As described below, the highest-speed position in the form of the eighth-speed position (8th) is selectable only when the shift lever 92 is placed in the auto-shift position D.

When the shift lever 92 is placed in the manual-shift position M, the manual shifting of the transmission 10 is controlled in one of two different manners which will be described. In the first manner, the number of the forward-drive positions selectable in the manual-shift position M can be changed in eight steps, depending upon a selected one of eight ranges D, 7, 6, 5, 4, 3, 2 and L which are electrically established. The table of FIG. 14 indicates the forward-drive positions of the normal-spread group, narrow-spread group and wide-spread group, which forward-drive positions are available in the eight ranges D through L that are selectively and electrically established by operating the shift lever 92, as described below. As described above, one of the normal-spread and narrow-spread groups is selected in the transmission 10 of the first embodiment of FIGS. 1–5, while one of the normal-spread and wide-spread groups is selected in the transmission 10 of the second embodiment of FIGS. 6–9. When the range D is electrically established, all of the eight forward-drive positions (first-speed through eighth-speed positions) of a selected one of the normal-spread, narrow-spread and wide-spread group are available, and the transmission 10 is automatically shiftable to any one of those eight forward-drive positions. When the range 7 is established, the first-speed through the seventh-speed positions are available, so that the transmission 10 is automatically shiftable to any one of those seven forward-drive positions. When the range L is established, only the first-speed position (1st) is available, so that the transmission 10 is automatically placed in this first-speed position. Thus, the number of the forward-speed positions available is reduced by changing the electrically established range from D toward L, such that the speed ratio of the highest-speed position is reduced as the number of the forward-speed positions available is reduced. Namely, the highest-speed position available is changed, for example, from the fifth-speed position (5th) to the fourth-speed position (4th) when the selected range is changed from the range 5 to the range 4. In the manually operable shifting device 94 shown in FIG. 13A, the manual-shift position M of the shift lever 92 is located at the same longitudinal position of the vehicle as the auto-shift position D and is spaced from the auto-shift position D in the lateral or transverse direction of the vehicle. By moving the shift leer 92 from the manual-shift position M to a shift-up position "+" or a shift-down position "−" in the longitudinal direction of the vehicle, one of the eight ranges D–L can be electrically selected or established. The shift lever 92 is biased by a suitable biasing means such as a spring to be normally held in the manual-shift position M, so that the shift lever 92 is automatically returned from the shift-up position "+" or shift-down position "−" to the manual-shift position M when a force acting on the shift lever 92 to hold it in the shift-up or shift-down position "+", "−" is removed by the vehicle operator. The electrically selected one of the ranges D through L is changed according to the number of successive movements of the shift lever 92 from the manual-shift position M to the shift-up position "+" or shift-down position "−", or the length of time for which the shift lever 92 is held in the shift-up or shift-down position "+", "−". The range initially selected when the shift lever 92 is moved to the manual-shift position M may be the range selected last while the shift lever 92 was placed in the auto-shift position D, that is, the range selected immediately before the shift lever 92 is moved from the auto-shift position D to the manual-shift position M. Alternatively, the initially selected range in the manual-shift position M may be the range which is next to the range selected last in the auto-shift position, as seen in the direction toward the range L. The range is changed one step from the initially selected range toward the range L each time the shift lever 92 is moved to the shift-down position "−", and toward the range D each time the shift lever 92 is moved to the shift-up position "+".

In the second manner of shifting control of the transmission 10 when the shift lever 92 is placed in the manual-shift position M, the transmission 10 is directly and manually shifted up or down from the currently selected forward-drive position (1st, 2nd, 3rd, 4th, 5th, 6th, 7th, or 8th) by moving the shift lever 92 from the manual-shift position M to the shift-up position "+" or shift-down position "−". For example, the transmission 10 is manually shifted up from the currently selected fourth-speed position (4th) to the fifth-speed position (5th) by moving the shift lever 92 from the manual-shift position M to the shift-up position "+", or from the currently selected fourth-speed position (4th) to the sixth-speed position (6th) by repeating the movement of the shift lever 92 from the manual-shift position M to the shift-up position "+" twice. As in the first manner described above, the forward-drive position is changed one step from the initially selected forward-drive position toward the first-speed position (1st) each time the shift lever 92 is moved to the shift-down position "−", and toward the eight-speed position (8th) each time the shift lever 92 is moved toward the shift-up position "+". The initially selected forward-drive position may be the position selected last while the shift lever 92 was placed in the auto-shift position D, or the position which is next to the position selected last in the automatic shifting mode, as seen in the direction toward the first-speed position.

The manually operable shifting device 94 is provided with the above-described shift-position sensor 98 operable to detect the currently selected position $P_{SH}$ of the shift lever 92. The output signal of this shift-position sensor 98 indicative of the presently selected position $P_{SH}$ is applied to the electronic control device 80. The shifting device 94 is further provided with a shifting-pattern selecting device in the form of a drive-mode selector switch 96 having a NORMAL drive-mode position and a POWER drive-mode position. When the drive-mode selector switch 96 is placed in the NORMAL drive-mode position, the transmission 10 is automatically shifted up and down according to a normal-drive shifting pattern suitable for normal or ordinary running of the vehicle. When the selector switch 96 is placed in the POWER drive-mode position, the transmission 10 is automatically shifted up and down according to a power-drive shifting pattern suitable for sporty or powerful running of the vehicle. For example, the normal-drive shifting pattern consists of the shift-up and shift-down boundary lines FIG. 12, and the power-drive shifting pattern consist of shift-up and shift-down boundary lines which are shifted from those of FIG. 12 in the direction of increase of the vehicle speed V (km/h) as seen in FIG. 12, so that shift-up and shift-down actions of the transmission 10 when the throttle valve has a given opening angle $\theta_{th}$ take place at higher vehicle speed V according to the shift-up and shift-down boundary lines of the power-drive shifting pattern than the shift-up and shift-down actions according to the boundary lines of the normal-drive shifting pattern of FIG. 12. Accordingly, the transmission 10 is placed in the relatively low-speed forward-drive positions at the relatively high vehicle speed, when the drive-mode selector switch 96 is placed in the POWER drive-mode position, so that the vehicle can be driven with a higher degree of drivability when the selector switch 96 is placed in the POWER drive-mode position. The drive-mode selector switch 96 may have other drive-mode positions in addition to the NORMAL and POWER drive-mode positions. For instance, the drive-mode selector switch 96 has an ECONOMY drive-mode position and a SNOW drive-mode position as well as the NORMAL and POWER drive-mode position. When the selector switch 96 is placed in the ECONOMY drive-mode position, the transmission 10 is automatically shifted up and down according to an economy-drive shifting pattern suitable for economical running of the vehicle with a high degree of fuel economy. When the selector switch 96 is placed in the SNOW drive-mode position, the transmission 10 is automatically shifted up and down according to a snow-drive shifting pattern suitable for running (starting or acceleration, in particular) of the vehicle on a snow-covered roadway surface or any other roadway surface having a relatively low coefficient of friction with respect to the vehicle tires. For example, the shift-up and shift-down boundary lines of the economy-drive shifting pattern are shifted from those of the normal-drive shifting pattern in the direction of decrease of the vehicle speed V, and the snow-drive shifting pattern is formulated to prevent the transmission 10 from being placed in the first-speed position. Namely, the shifting actions of the transmission 10 take place at the relatively low vehicle speed according to the economy-drive shifting pattern than those according to the normal-drive shifting pattern, so that the vehicle is driven with a relatively small drive force. According to the snow-drive shifting pattern, the first-speed position is not established, and the second-speed position is the lowest-speed position, so that the vehicle drive force in the lowest-speed position of the transmission 10 available is reduced.

Figure 13B:
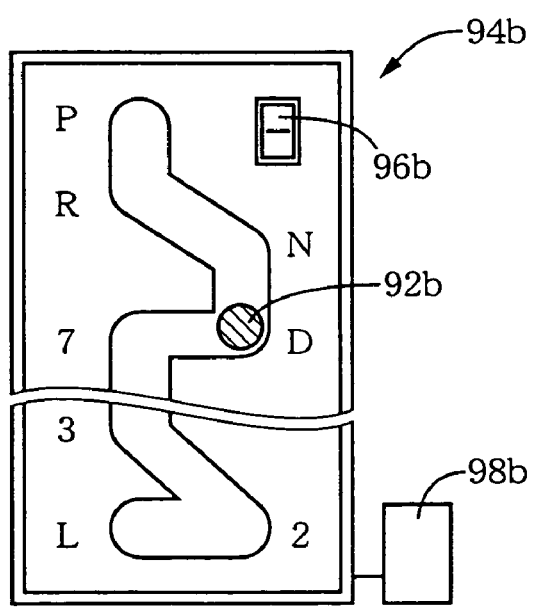
FIG. 13B us a view showing another example of the manually operable shifting device.

FIG. 13B shows a manually operable shifting device 94b which is a modification of the shifting device 94. Like the shifting device 94 of FIG. 13A, this shifting device 94b is disposed adjacent to the vehicle operator's seat, and has the parking position P, reverse position R neutral position N, and auto-shift position D. However, the shift lever 94b further has seven positions 7, 6, 5, 4, 3, 2 and L for selecting the respective ranges 7-L that are equivalent to the ranges 7-L selectable in the above-described first manner by moving the shift lever 92 of FIG. 13A from the manual-shift position M to the shift-up and shift-down positions "+", "−". Thus, the positions P, R, N, D and 7-L of the shift lever 92a have the same functions as described above with respect to the shift lever 92. Like the shifting device 94, the shifting device 94b is provided with a drive-mode selector switch 96b and a shift-position sensor 98b which are identical in function with the selector switch 96 and shift-position sensor 98 described above. The drive-mode selector switch 96b may have a MANUAL SHIFTING drive-mode position as well as the NORMAL and POWER drive-mode positions (or NORMAL, POWER, ECONOMY and SNOW drive-mode positions). When the drive-mode selector switch 96b is placed in the MANUAL SHIFTING drive-mode position, a manual-shifting pushbutton provided on the steering wheel of the vehicle becomes effective to manually shift up or down the transmission 10 to a selected one of the forward-drive positions, as in the second manner of shifting control of the transmission 10 by moving the shift lever 92 of the shifting device 94 from the manual-shift position M to the shift-up and shift-down positions "+", "−". In this manual shifting with the selector switch 96b placed in the MANUAL SHIFTING drive-mode position, the transmission 10 is manually shifted within the currently established range. For example, the transmission 10 is shifted to any one of the eight forward-drive positions (1st through 8th) when the shift lever 94b is placed in the auto-shift position D. The drive-mode selector switch 96b need not have the MANUAL SHIFTING drive-mode position, and a manual shifting selector switch may be provided in addition to the drive-mode selector switch 96b not having the MANUAL SHIFTING drive-mode position.

Referring next to the block diagram of FIG. 15, there will be described major functional portions of the electronic control device 80 which are arranged to control the shifting actions of the transmission 10. The electronic control device 80 incorporates a shifting control portion 100 operable to control the transmission 10 through the hydraulic control circuit 88, a drive-force-increase determining portion 102, a drive-position-group selecting portion 104, and a vehicle-condition detecting portion 106. The vehicle-condition detecting portion 106 is arranged to detect the condition of the vehicle such as speed $N_E$ of the engine 8, speed $N_{IN}$ of the input shaft 16 (speed $N_T$ of the turbine impeller of the torque converter 14), vehicle running speed V, opening angle $\theta_{th}$ of the throttle valve, operating amount $A_{CC}$ of the accelerator pedal, currently selected drive mode (NORMAL, POWER, ECONOMY, SNOW drive mode, etc.) of the vehicle, currently selected position $P_{SH}$ of the shift lever 92 (92a, 92b, 92c), distance between the vehicle in question and the preceding vehicle, and acceleration value and total weight of the vehicle in question, on the basis of the outputs of the various sensors such as the engine speed sensor, turbine speed sensor, output gear speed sensor 60, throttle opening sensor, accelerator sensor, drive-mode selector switch 96, shift-position sensor 98, vehicle-to-vehicle distance sensor 62, vehicle acceleration sensor 66 and vehicle weight sensor 68. The vehicle-condition detecting portion 106 is further arranged to detect a change of the shifting mode of the transmission 10 between the automatic shifting mode and the manual shifting mode, on the basis of the output of the shift-position sensor 98 which is arranged to detect that the shift lever 92 is moved from the auto-shift position D to the manual-shift position M or vice versa.

The shifting control portion 100 is arranged to apply control signals $S_P$ to the hydraulic control circuit 88, for controlling the engaging and releasing actions of the hydraulically operated frictional coupling devices in the form of the clutches C1–C4 and brakes B1–B3, so as to shift up and down the transmission 10 according to the currently selected position of the shift lever 92 (92a, 92b, 92c) detected by the vehicle-condition detecting portion 106. When the shift lever 92 placed in the auto-shift position D is detected by the vehicle-condition detecting portion 106, the shifting control portion 100 determines a need for a shift-up or shift-down action of the transmission 10 from the presently selected operating position to an appropriate one of the operating positions, on the basis of the detected throttle opening angle $\theta_{th}$ and vehicle speed V, and according to the predetermined shift-up and shift-down boundary lines stored in the ROM, and applies the appropriate control signals $S_p$ to the hydraulic control circuit 88, for controlling the clutches C1–C4 and brakes B1–B3 to effect the determined shift-up or shift-down action of the transmission 10. This shifting control of the transmission 10 by the shifting control portion 100 is effected according to one of the normal-spread and narrow-spread groups or the normal-spread and wide-spread groups of forward-drive positions, which is selected by the drive-position-group selecting portion 104, as described below.

The drive-force-increase determining portion 102 includes an uphill road determining portion 108, a tracing control determining portion 110 and a vehicle weight determining portion 112, and is arranged to determine whether it is necessary to increase the vehicle drive force during running of the vehicle with the transmission 10 placed in the seventh-speed or eighth-speed position. This determination is effected on the basis of the output signals of the uphill road determining portion 108, tracing control determining portion 110 and vehicle weight determining portion 112. As described below by reference to the flow chart of FIG. 16, the drive-force-increase determining portion 102 determines necessity for increasing the vehicle drive force, when the uphill road determining portion 108 has determined that the vehicle is running on an uphill roadway, when the tracing control determining portion 110 has determined that the vehicle is under the tracing control to trace the preceding vehicle, or when the vehicle weight determining portion 112 has determined that the vehicle weight is higher than a predetermined threshold value A. In this respect, it is noted that each of the vehicle running on an uphill roadway, the tracing control and the vehicle weight higher than the threshold value A is a vehicle condition that indicates or has a risk of frequent shift-up and shift-down actions of the transmission 10, which repeatedly take place more than a predetermined number of times per unit time, so as to maintain the vehicle running speed with repeated alternate acceleration and deceleration of the vehicle. Namely, the frequent shift-up and shift-down actions of the transmission 10 are usually initiated when it becomes necessary to increase the vehicle drive force in such events as described above. In other words, the drive-force-increase determining portion 102 is arranged to detect a condition of the vehicle that may cause or has a risk of the frequent shift-down and shift-up actions of the transmission 10. The upper limit of the vehicle condition (e.g., threshold value A indicated above) above which the drive-force-increase determining portion 102 determines that the expected frequency of the shift-up and shift-down actions of the transmission 10 is higher than the threshold is predetermined by experimentation.

The uphill road determining portion 108 is arranged to determine whether the roadway on which the vehicle is running or is going to run is an uphill roadway or not. For instance, the determination as to whether the vehicle is running on an uphill roadway or not is made on the basis of the detected vehicle running speed V and acceleration value, or an output of a gravity sensor operable to detect the gravity acting on the vehicle body, and the determination as to whether the vehicle is going to run on an uphill roadway is made on the basis of information indicative of the present position of the vehicle, which is received from a vehicle position determining device 52 (FIG. 15) arranged to determine the present vehicle position, for example, from a well known navigation system (global positioning system) arranged to detect the present position of the vehicle on the basis of a signal received from an artificial earth satellite. The uphill road determining device 108 may be arranged to make the above-indicated determination, by determining whether a running resistance of the vehicle is higher than a predetermined upper limit. The vehicle running resistance may be calculated on the basis of the output torque of the drive power source, for example, the engine torque $T_E$ and an acceleration value of the vehicle corresponding to the instantaneous running speed V. This arrangement of the uphill road determining device 108 may be advantageous in that the wind force or velocity is also taken into account for determining the required vehicle drive force on an uphill roadway. The upper limit of the vehicle running resistance is predetermined by experimentation conducted with the vehicle runs on uphill roadways of various gradients with various engine torque values and wind conditions. When the uphill road determining portion 108 determines that the vehicle is running or is going to run on an uphill roadway, this means a necessity for increasing the vehicle drive force for maintaining the vehicle speed, and therefore the drive-force-increase determining portion 102 determines in this case that the vehicle drive force is required to be increased while the vehicle is running with the transmission 10 placed in a relatively high-speed position, that is, in the seventh-speed position (7th) or eighth-speed position (8th).

The tracing control determining portion 110 is arranged to determine whether the vehicle is under the tracing control wherein the vehicle speed is controlled so as to maintain the vehicle running speed at a predetermined value, while maintaining a predetermined distance between the vehicle in question and the preceding vehicle. For example, this determination is made by determining whether a laser cruise control of the vehicle speed has been initiated upon detection of the preceding vehicle with a laser radar while a cruise control switch 50 (FIG. 15) is in the on state. In this respect, it is noted that the tracing control involves repeated alternate acceleration and deceleration of the vehicle so as to maintain the predetermined distance between the vehicle in question and the preceding vehicle, and therefore requires an increase of the speed ratio of the transmission 10 to facilitate the vehicle acceleration and deceleration. In other words, the tracing control requires an increase of the vehicle drive force. When the tracing control determining portion 110 determines that the vehicle is under the tracing control, this means a necessity for increasing the vehicle drive force for maintaining the vehicle speed, and therefore the drive-force-increase determining portion 102 determines in this case that the vehicle drive force is required to be increased while the vehicle is running with the transmission 10 placed in the seventh-speed position (7th) or eighth-speed position (8th).

The vehicle weight determining portion 112 is arranged to determine whether the total weight of the vehicle is larger than the threshold value A. The total weight consists of a sprung weight of the vehicle per se, a passenger load and a cargo load. The threshold value A is predetermined by experimentation such that the vehicle drive force is required to be increased when the total vehicle weight is larger than the threshold value A, or such that the threshold value A minus the sprung weight of the vehicle is equal to a total load on the vehicle, which corresponds to a gradient of the roadway above which the roadway is determined to be an uphill roadway. The vehicle weight sensors 64 used by the vehicle weight determining portion 112 may be displacement sensors operable to detect amounts of deflection or any other forms of deformation of components of a suspension system of the vehicle. The vehicle weight sensors 64 may be replaced by a high-load switch which is operable by the vehicle operator when the vehicle operator considers the number of passengers or the cargo load on the vehicle is larger than a threshold. When the high-load switch is in the on state, the vehicle weight determining portion 112 determines that the vehicle total weight is larger than the threshold value A. When the vehicle weight determining portion 112 determines that the vehicle total weight is larger than the threshold value A, this means a necessity for increasing the vehicle drive force for maintaining the vehicle speed, and therefore the drive-force-increase determining portion 102 determines in this case that the vehicle drive force is required to be increased while the vehicle is running with the transmission 10 placed in the seventh-speed position (7th) or eighth-speed position (8th).

The drive-position-group selecting portion 104 is arranged to select one of the normal-spread and narrow-spread groups of forward-drive positions of the transmission 10, or one of the normal-spread and wide-spread groups of forward-drive positions, on the basis of the output of the drive-force-increase determining portion 102. In the transmission 10 of the first embodiment of FIGS. 2–5, the drive-position-group selecting portion 104 selects the narrow-spread groups of forward-drive positions when the drive-force-increase determining portion 102 determines that the total vehicle weight is larger than the threshold value A, namely, when it is necessary to increase the vehicle drive force. In this respect, it is noted that the seventh-speed and eighth-speed positions (7th and 8th) of the narrow-spread group provide a larger vehicle drive force than those of the normal-spread group. In the transmission 10 of the second embodiment of FIGS. 6–9, the drive-position-group selecting portion 104 selects the normal-spread group of forward-drive positions when the drive-force-increase determining portion 102 determines that the total vehicle weight is larger than the threshold value A. The seventh-speed and eighth-speed positions of the normal-spread group provide a larger vehicle drive force than those of the wide-spread group. Thus, when the vehicle drive force is required to be increased, the drive-position-group selecting portion 104 selects one of the two groups that includes the relatively high-speed positions (seventh-speed and eighth-speed positions) which provide a larger vehicle drive force or the speed ratios of which are higher, than those of the other group. The seventh-speed and eighth-speed positions of the narrow-spread group not only have the higher speed ratios and provide the accordingly larger vehicle drive force than those of the normal-spread group, but also provide a larger vehicle braking or decelerating force (engine braking force). In this sense, the drive-force-increase determining portion 102 also determines whether it is required to increase the vehicle decelerating force. Therefore, the drive-force-increase determining portion 102 is considered to determine whether it is necessary to increase the vehicle accelerating and decelerating forces. The drive-position-group selecting portion 104 is further arranged to select the same one of the two groups of forward-drive positions, in the automatic shifting mode and the manual shifting mode, in order to prevent an undesirable change of the speed ratio of the transmission 10 due to the switching of the shifting mode. For instance, the drive-position-group selecting portion 104 is operated, upon detection of the shifting mode from the automatic shifting mode to the manual shifting mode by the vehicle-condition detecting portion 106, to select the group of forward-drive positions which was selected last in the automatic shifting mode, that is, selected immediately before a moment of shifting of the automatic transmission 10 from the automatic shifting mode to the manual shifting mode by a movement of the shift lever 92 from the auto-shift position D to the manual-shift position M. The shifting device 94 may be provided with a drive-position-group selecting switch 90 manually operable to select one of the normal-spread and narrow-spread groups of forward-drive positions or one of the normal-spread and wide-spread groups of forward-drive positions. In this case, the vehicle-condition detecting portion 106 detects the group of forward-drive positions currently selected by the drive-position-group selecting switch 90.

Figure 16:
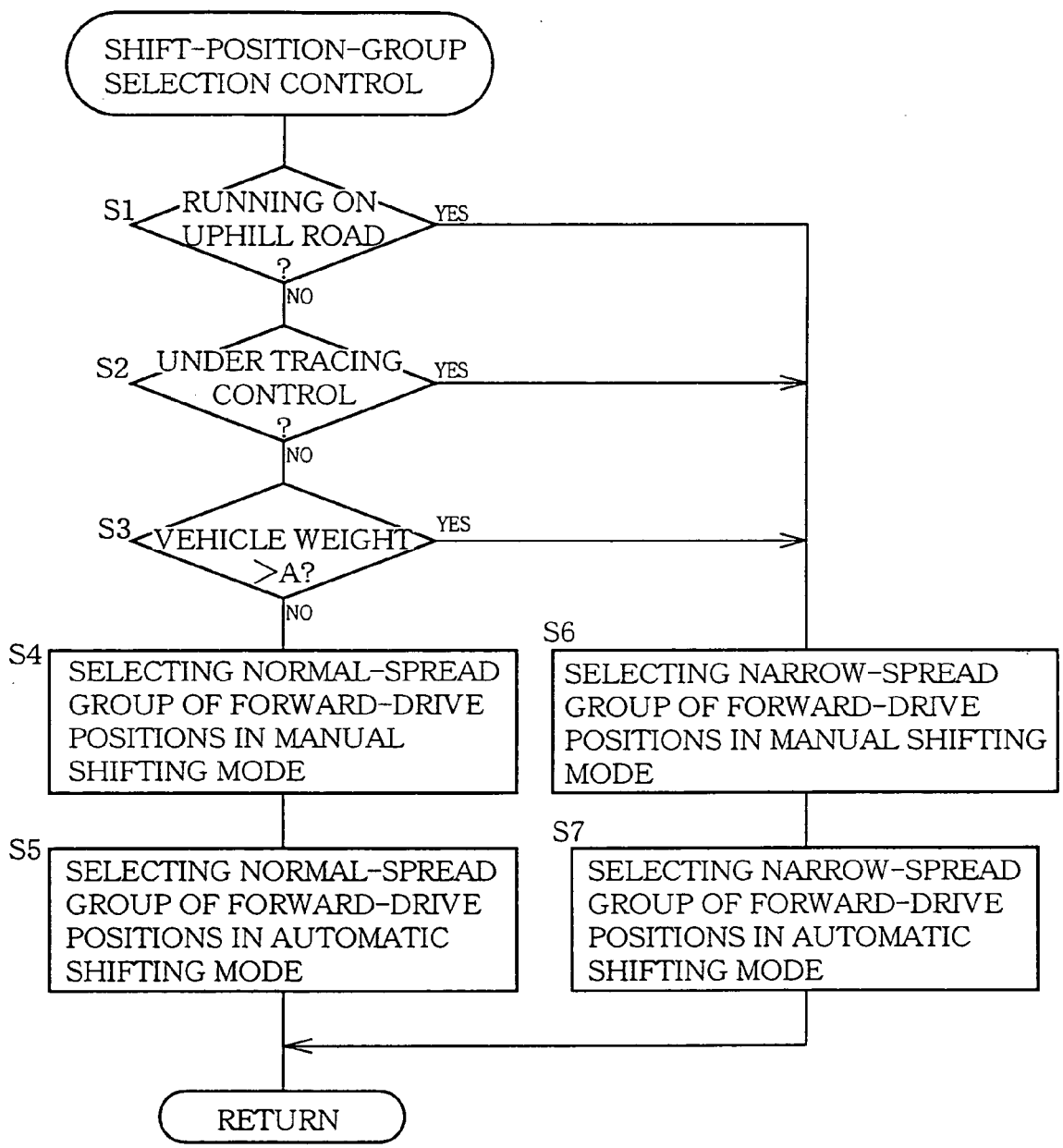
FIG. 16 is a flow chart illustrating a control routine executed by the electronic control device of FIG. 10 to select one of the normal-spread and narrow-spread groups of forward-drive positions of the automatic transmission of the first embodiment of FIG. 1.

Referring next to the flow chart of FIG. 16, there will be described the operation of the electronic control device 80 to select one of the normal-spread and narrow-spread groups of forward-drive positions of the transmission 10 of the first embodiment of FIGS. 2–5, that is, one of the normal-spread group of forward-drive positions of FIGS. 2 and 3 and the narrow-spread groups of forward-drive positions of FIGS. 4 and 5, by way of example. The control routine illustrated in the flow chart of FIG. 16 is initiated with step S1 corresponding to the drive-force-increase determining portion 102 and the uphill road determining portion 108, to determine whether the vehicle is running or going to run on an uphill roadway, as described above. This determination is made to determine whether it is necessary to increase the vehicle drive force while the vehicle running with the transmission 10 placed in the seventh-speed or eighth-speed position. If a negative decision (NO) is obtained in step S1, the control flow goes to step S2 corresponding to the drive-force-increase determining portion 102 and the tracing control determining portion 110, to determine whether the vehicle is under the tracing control such as the laser radar cruise control, as described above. This determination is also made to determine whether it is necessary to increase the vehicle drive force during running of the vehicle with transmission 10 placed in the seventh-speed or eighth-speed position. If a negative decision (NO) is obtained in step S2, the control flow goes to step S3 corresponding to the drive-force-increase determining portion 102 and the vehicle weight determining portion 112, to determine whether the total vehicle weight is larger than the threshold value A. This determination is also made to determine whether the vehicle drive force is required to be increased with the transmission 10 placed in the seventh-speed or eighth-speed position. If a negative decision (NO) is obtained in step S3, the control flow goes to step S4 corresponding to the drive-position-group selecting portion 104, to select the normal-spread group of forward-drive positions, as the group used in the manual shifting mode. Step S4 is followed by step S5 also corresponding to the drive-position-group selecting portion 104, to select the normal-spread group, as the group used in the automatic shifting mode.

If an affirmative decision (YES) is obtained in any one of steps S1, S2 and S3, the control flow goes to step S6 also corresponding to the drive-position-group selecting portion 104, to select the narrow-spread group of forward-drive positions, as the group used in the manual shifting mode. The control flow then goes to step S7 also corresponding to the drive-position-group selecting portion 104, to select the narrow-spread group, as the group used in the automatic shifting mode.

Figures 6, 7:
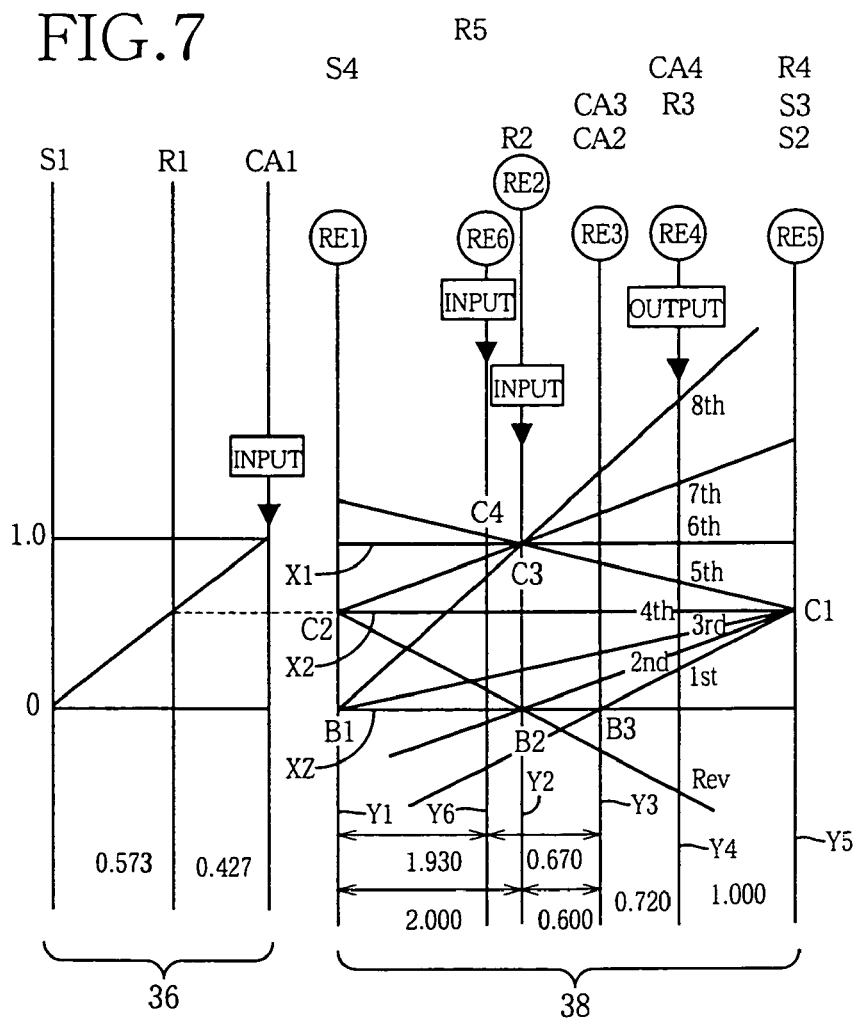
FIG. 6 is a view corresponding to that of FIG. 2, indicating a relationship between the operating positions of a planetary gear type multi-step automatic transmission constructed according to a second embodiment of this invention, and respective combinations of operating states of the frictional coupling devices, when a normal-spread group of operating positions is selected.
FIG. 7 is a collinear chart showing an operation of the automatic transmission of the second embodiment when the normal-spread group of operating positions is selected.

While the control routine for selecting one of the normal-spread and narrow-spread groups of forward-drive positions of the transmission 10 has been described above by reference to the flow chart of FIG. 16, a control routine similar to the control routine of FIG. 16 is executed for selecting one of the normal-spread group of FIGS. 6 and 7 and the wide-spread group of FIGS. 8 and 9. Namely, steps S4 and S5 are modified to select the wide-spread group of forward-drive positions, and steps S6 and S7 are modified to select the normal-spread group of forward-drive positions. That is, the drive-position-group selecting portion 104 is arranged to select, in steps S6 and S7, one of the two groups of forward-drive positions the seventh-speed and eighth-speed positions of which have the higher speed ratios than those of the other group, when the drive-force-increase determining portion 102 has determined, in step S1, S2 or S3, that it is necessary to increase the vehicle drive force during running of the vehicle with the transmission 10 placed in a relatively high-speed position in the form of the seventh-speed or eighth-speed position.

As described above, one of the two groups of forward-drive positions of the transmission 10 the seventh-speed and eighth-speed positions of which have the higher speed ratios is selected when it is necessary to increase the vehicle drive force while the vehicle is running with the transmission 10 placed in the seventh-speed or eighth-speed position. Accordingly, the vehicle can be driven or accelerated with a sufficient drive force during running of the vehicle with the transmission 10 placed in the seventh-speed or eighth-speed position. When the vehicle is running in a steady state at a substantially constant running speed, the group of forward-drive positions the seventh-speed and eighth-speed positions of which have the relatively low speed ratios is selected, so that the fuel economy of the vehicle is improved, and operating noise of the engine 8 is reduced. Further, the same group of forward-drive positions is selected in the automatic and manual shifting modes, to prevent an undesirable change of the speed ratio of the transmission 10 upon switching of the shifting mode between the automatic and manual shifting modes.

In addition, the control routine (steps S1–S7) of FIG. 16 does not cause frequent shift-up and shift-down actions of the transmission 10 and permits a reduced amount of change of the speed ratio of the transmission 10 and a reduced amount of change of drivability of the vehicle, unlike the conventional control of an automatic transmission wherein the vehicle drive force is increased by a shift-down action of the transmission or by inhibiting a shift-up action of the transmission to the highest-speed position and using the next-highest-speed position the speed ratio of which is higher than the highest-speed position. Further, the reduced amount of change of the speed ratio of the transmission 10 according to the control routine of FIG. 16 results in an improvement in the fuel economy of the vehicle. In the conventional tracing control of the vehicle speed, the vehicle acceleration and deceleration are repeated so as to maintain a predetermined distance of the vehicle in question with respect to the preceding vehicle, such that the transmission is shifted down to obtain sufficient vehicle accelerating and decelerating forces, and is then shifted up when the predetermined distance between the vehicles is obtained. According to the control routine of FIG. 16, however, the shift-down action of the transmission according to the conventional tracing control which tends to suffer from the frequent shift-down and shift-up actions of the transmission is replaced by the selection of the narrow-spread group of forward-drive positions the seventh-speed and eighth-speed positions of which provide a larger vehicle drive force (i.e., larger vehicle accelerating and decelerating forces) than those of the normal-spread group, while preventing frequent shift-down and shift-up actions of the transmission 10. Further, the selection of the narrow-spread group of forward-drive positions rather than the inhibition of the shift-up action to the highest-speed position causes a reduced amount of change of the speed ratio of the transmission, which results in an improvement in the fuel economy of the vehicle. Where the shift-up action of the transmission 10 to the eighth-speed position (8th) of the normal-spread group of FIG. 14 (FIG. 2) was inhibited, the speed ratio would be changed (increased) to a considerably large extent from 0.602 of the eighth-speed position to 0.780 of the seventh-speed position, so that the vehicle operator would feel an unexpectedly large change of the accelerating and decelerating drivability of the vehicle, and the fuel economy of the vehicle would be deteriorated. According to the control routine of FIG. 16, on the other hand, the narrow-spread group of forward-drive positions is selected in place of the normal-spread group when it becomes necessary to increase the vehicle drive force, so that the speed ratio is increased by a comparatively small amount from 0.602 of the eighth-speed position of the normal-spread group to 0.648 of the eighth-speed position of the narrow-spread group. Thus, the amounts of change of the speed ratio of the transmission 10 and the accelerating and decelerating drivability of the vehicle are effectively reduced, and the fuel economy is improved, according to the control routine of FIG. 16.

In the first and second embodiments of this invention described above, the drive-force-increase determining portion 102 (steps S1–S3) determines whether it is necessary to increase the vehicle drive force while the vehicle is running with the transmission 10 placed in the seventh-speed or eighth-speed position, and the drive-position-group selecting portion 104 (steps S4–S7) selects one of the normal-spread and narrow-spread groups of forward-drive positions, or one of the normal-spread and wide-spread groups of forward-drive positions, depending upon the result of determination by the drive-force-increase determining portion 102, so that the vehicle can be driven with an adequate drive force with the transmission 10 placed in the seventh-speed or eighth-speed position, with an improved degree of fuel economy of the vehicle, while preventing or restricting frequent shift-up and shift-down actions of the transmission 10.

Further, the drive-position-group selecting portion 104 (steps S4–S7) selects one of the two groups of forward-drive positions the seventh-speed and eighth-speed positions of which have higher speed ratios and provide larger drive forces than those of the other group, when the drive-force-increase determining portion 102 (steps S1–3) has determined that it is necessary to increase the vehicle drive force.

The drive-force-increase determining portion 102 (steps S1–S3) determines that it is necessary to increase the vehicle drive force, when the vehicle is in a condition that causes frequent shifting actions of the transmission 10, for example, when the frequent shifting actions are actually detected or expected to take place in the near future. Accordingly, the vehicle can be driven with an adequate drive force, while preventing or restricting the frequent shifting actions of the transmission 10.

In addition, the drive-force-increase determining portion 102 (S1) determines that the vehicle drive force is required to be increased, when the uphill road determining portion 108 (S1) has determined that the vehicle is running on an uphill roadway. Accordingly, the vehicle can be driven with a sufficient drive force on an uphill roadway.

Further, the drive-force-increase determining portion 102 (S1) determines that the vehicle drive force is required to be increased, when the uphill road determining portion 108 (S1) has determined that the vehicle is running or going to run on an uphill roadway, on the basis of the vehicle position represented by suitably obtained vehicle position information. Accordingly, the vehicle can be driven with a sufficient drive force on an uphill roadway.

The uphill road determining portion 108 (S1) may be arranged to effect the determination as to whether the vehicle is running on an uphill roadway, on the basis of the detected running speed and acceleration value of the vehicle. Accordingly, the vehicle can be driven with a sufficient drive force on the uphill roadway.

Further, the drive-force-increase determining portion 102 (S2) determines that it is necessary to increase the vehicle drive force, when the tracing control determining portion 110 (S2) has determined that the vehicle is under the tracing control so as to trace the preceding vehicle. Accordingly, the vehicle can be driven with an adequate drive force and with a high degree of vehicle accelerating and decelerating drivability, so as to trace the preceding vehicle, while preventing or restricting frequent shift-up and shift-down actions of the transmission 10. In the conventional tracing control, the vehicle is repeatedly and alternately accelerated and decelerated with alternate shift-down and shift-up actions of the automatic transmission, so as to maintain a predetermined distance between the vehicle in question and the preceding vehicle. According to the control routine of FIG. 16, however, the drive-position-group selecting portion 104 selects one of the two groups of forward-drive positions which provides a larger drive force with the transmission 10 placed in the seventh-speed or eighth-speed position, thereby preventing the frequent shifting actions of the transmission 10, which would take place during the tracing control of the vehicle.

According to the control routine executed in the illustrated embodiment, the vehicle can be driven with a sufficient drive force and a high degree of vehicle accelerating and decelerating drivability, while preventing or restricting frequent shifting actions of the transmission 10, even when the vehicle is under the tracing control wherein the vehicle speed is controlled such that the distance of the vehicle in question with respect to the preceding vehicle, which is detected by the vehicle-to-vehicle distance sensor 62, is maintained at a predetermined value.

Further, the drive-force-increase determining portion 102 (S3) determines that the vehicle drive force is required to be increased, when the vehicle weight determining portion 112 (S3) has determined that the total vehicle weight is larger than the threshold value A. Accordingly, the vehicle can be driven with a sufficient drive force even when the vehicle load is relatively large.

In addition, an appropriate one of the normal-spread and narrow-spread or wide-spread groups of forward-drive positions of the transmission 10 is selected depending upon the specific running condition of the vehicle or the vehicle operator's desired manner of driving of the vehicle. For instance, the narrow-spread group of forward-drive positions is selected when it is necessary or desired to drive the vehicle with a sufficient drive force with the transmission 10 placed in the seventh-speed or eighth-speed position, and the wide-spread group is selected when it is necessary or desired to drive the vehicle with a high degree of fuel economy.

In the present transmission 10, the two groups of forward-drive positions are easily obtained by changing the combinations of the two frictional coupling devices to be engaged to establish the seventh-speed and eighth-speed positions, more precisely, by engaging the third clutch C3 as well as the second clutch C2 to establish the seventh-speed position of the normal-spread group, and the third clutch C3 as well as the first brake B1 to establish the eighth-speed position of the normal-spread group, and by engaging the fourth clutch C4 as well as the second clutch C2 to establish the seventh-speed position of the narrow-spread or wide-spread group, and the fourth clutch C4 as well as the first brake B1 to establish the eighth-speed position of the narrow-spread or wide-spread group.

Referring next to FIGS. 17–21, there will be described an automatic transmission constructed according to a third embodiment of this invention. In this embodiment, the same reference signs as used in the first embodiment of FIGS. 1–5 will be used to identify the functionally corresponding components, which will not be described.

Figure 17:
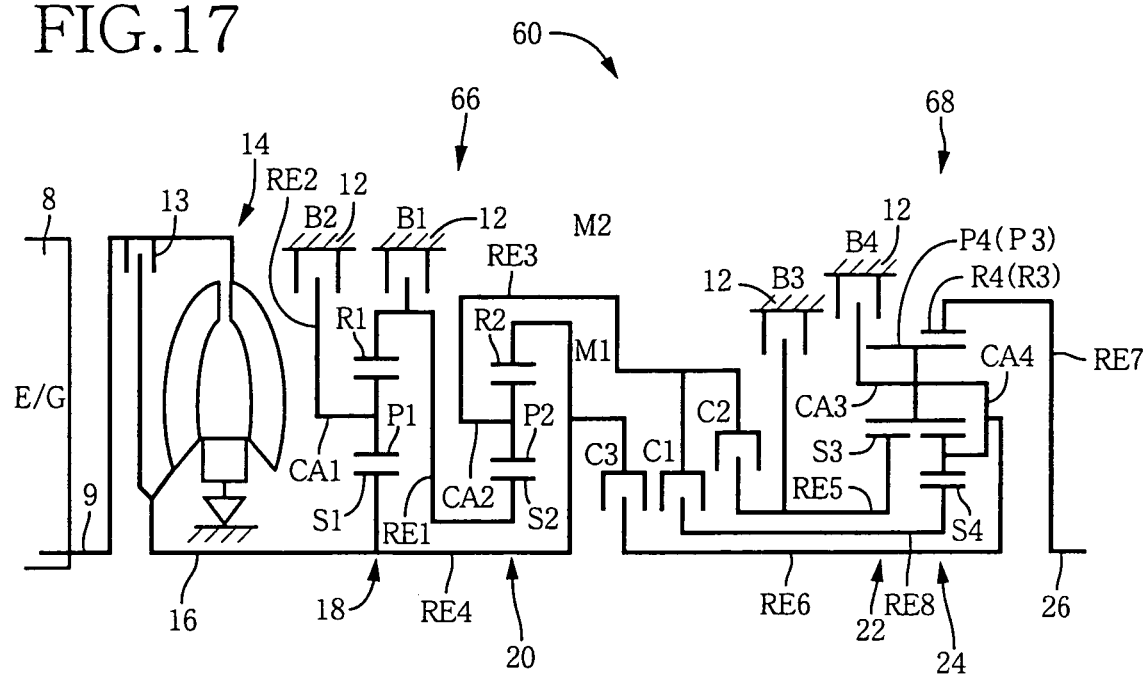
FIG. 17 is a schematic view illustrating a basic arrangement of a planetary gear type multiple-step automatic transmission for a vehicle, which is constructed according to a third embodiment of the present invention.

As shown in the schematic view of FIG. 17, an automatic transmission 60 according to the third embodiment includes a first shifting portion 66 having the first and second planetary gear sets 18, 20, and a second shifting portion 68 having the third and fourth planetary gear sets 22, 24. The transmission 60 has a first normal-spread group of ten operating positions indicated in the table of FIG. 18 and the collinear chart of FIG. 19.

Each of the first and second planetary gear sets 18, 20 of the first shifting portion 66 of the transmission 60 is of a single-pinion type. The first planetary gear set has a first sun gear S1, a first planetary gear P1, a first carrier P1 supporting the first planetary gear P1 such that the first planetary gear P1 is rotatable about its axis and rotatable about the axis of the first sun gear S1, and a first ring gear R1 meshing with the first sun gear S1 through the first planetary gear P1. The first planetary gear set 18 has a gear ratio $\rho 1$ of about 0.429. The second planetary gear set 20 has a second sun gear S2, a second planetary gear P2, a second carrier CA2 supporting the second planetary gear P2 such that the second planetary gear P2 is rotatable about its axis and rotatable about the axis of the second sun gear S2, and a second ring gear R2 meshing with the second sun gear S2 through the second planetary gear P2. The second planetary gear set 20 has a gear ratio ρ1 of about 0.539.

In the first shifting portion 66, the first ring gear R1 and second sun gear S2 which are integrally connected to each other are selectively fixed by a first brake B1 to the non-rotatable member in the form of the transmission casing 12, and the first carrier CA1 is selectively fixed by a second brake B2 to the transmission casing 12, while the second carrier CA2 functions as the second intermediate output member connected to the second intermediate output path M2. The first sun gear S1 and second ring gear R2, which are integrally connected to each other, are function as the first intermediate output member connected, and are connected to the input shaft 16 and the first intermediate output path M1. The first shifting portion 66 is arranged to transmit a rotary motion of the input shaft 16 to the second shifting portion 68 through the first intermediate output path M1, and the second intermediate output path M2 the speed of which is reduced with respect to that of the first intermediate output path M1. Although the first shifting portion 66 in the present fifth embodiment is arranged such that the first intermediate output path M1 is connected to the input shaft 16 and is rotated with the input shaft 16, the first intermediate output path M1 need not be connected to the input shaft 16.

The third planetary gear set 22 of the second shifting portion 68 is of a single-pinion type, and the fourth planetary gear set 24 is of a double-pinion type. The third planetary gear set 22 has a third sun gear S3, a third planetary gear P3, a third carrier CA3 supporting the third planetary gear P3 such that the third planetary gear P3 is rotatable about its axis and rotatable about the axis of the third sun gear S3, and a third ring gear R3 meshing with the third sun gear S3 through the third planetary gear P3. The third planetary gear set 24 has a gear ratio ρ3 of about 0.550, for example. The fourth planetary gear set 24 has a fourth sun gear S4, a plurality of pairs of fourth planetary gears P4, a fourth carrier CA4 supporting the fourth planetary gears P4 such that each fourth planetary gear P4 is rotatable about its axis and rotatable about the axis of the fourth sun gear S4, and a fourth ring gear R4 meshing with the sun gear S4 through the fourth planetary gears P4. The fourth planetary gear set 24 a gear ratio ρ4 of about 0.497, for example.

The third and fourth planetary gear sets 22, 24 are arranged such that the third and fourth carriers CA3, CA4 are constituted by a single common component, and the third and fourth ring gears R3, R4 are constituted by a single common component, while the third planetary gear P3 also functions as one of the two meshing third planetary gears P4. Each of the single common components indicated above may be two separate components.

In the second shifting portion 68, the third sun gear S3 is selectively connected through a second clutch C2 to the second intermediate output path M2, namely, to the second carrier CA2 functioning as the second intermediate output member, and is selectively fixed by a third brake B3 to the non-rotatable member in the form of the transmission casing 12. The third and fourth carriers CA3, CA4, which are integrally connected to each other, are selectively connected through a third clutch C3 to the first intermediate output path M1, namely, to the first sun gear S1 and the second ring gear R2, which function as the first intermediate output member, and is selectively fixed by a fourth brake B4 to the transmission casing 12. The third and fourth ring gears R3, R4, which are integrally connected to each other, are connected to the output member in the form of the output shaft 26, and the fourth sun gear S4 is selectively connected through a first clutch C1 to the second carrier CA2 functioning as the second intermediate output member.

The first, second and third clutches C1–C3 and the first through fourth brakes B1–B4 are all hydraulically operated frictional coupling devices widely used in known step-variable automatic transmissions, multiple-disc type frictional coupling devices, as described above with respect to the first embodiment.

In the transmission 60 constructed as described above, a selected one of eight forward-drive positions (1st through 8th) and two rear-drive positions (R1, R2) are established by simultaneous engaging actions of a corresponding combination of two or three frictional coupling devices selected from the first, second and third clutches C1–C5 and the first through fourth brakes B1, B2, as shown in FIG. 18. The eight forward-drive positions have respective speed ratios γ1–γ8 that change as geometric series. The gear ratio γ is equal to $N_{IN}/N_{OUT}$, where $N_{IN}$ and $N_{OUT}$ represent rotating speeds of the input shaft 16 and the output shaft 26, respectively.

As shown in FIG. 18, the first-speed position (1st) having the highest speed ratio γ1 of about 4.020, for example, is established by engaging actions of the first clutch C1 and the second and fourth brakes B2, B4. The second-speed position (2nd) having the speed ratio γ2 of about 2.717, for example, which is lower than that of the first-speed position, is established by engaging actions of the first clutch C1 and the second and third brakes B2, B3. The third-speed position (3rd) having the speed ratio γ3 of about 2.000, for example, which is lower than that of the second-speed position, is established by engaging actions of the first and second clutches C1, C2 and the second brake B2. The fourth-speed position (4th) having the speed ratio γ4 of about 1.538, for example, which is lower than that of the third-speed position, is established by engaging actions of the first and second clutches C1 and C2 and the first brake B1. The fifth-speed position (5th) having the speed ratio γ5 of about 1.211, for example, which is lower than that of the fourth-speed position, is established by engaging actions of the first and third clutches C1 and C3 and the first brake B1. The sixth-speed position (6th) having the speed ratio γ6 of about 1.000, for example, which is lower than that of the fifth-speed position, is established by engaging actions of the first, second and third clutches C1–C3. The seventh-speed position (7th-2)) having the speed ratio γ7 of about 0.784, for example, which is lower than that of the sixth-speed position, is established by engaging actions of the second and third clutches C2 and C3 and the second brake B2. The eighth-speed position (8th) having the speed ratio γ8 of about 0.645, for example, which is lower than that of the seventh-speed position, is established by engaging actions of the third clutch C3 and the third brake C3.

The first rear-drive position (R1) having a speed ratio $γ_{R1}$ of 3.636, for example, which is intermediate between those of the first-speed and second-speed positions, is established by engaging actions of the second clutch C2 and the second and fourth brakes B2, B4, and the second rear-drive position (R2) having a speed ratio $γ_{R2}$ of 2.797, for example, which is lower than that of the first rear-drive position and is almost equal to the second to that of the second-speed position, is established by engaging actions of the second clutch C2 and the first and fourth brakes B1, B4. The first-speed through eighth-speed positions (1st through 8th) indicated in FIG. 18 constitute the first normal-spread group of forward-drive positions having a set of speed ratios γ1–γ8. The speed ratios ρ1–ρ4 of the first through fourth planetary gear sets 18, 20, 22, 24 are determined to establish the above-indicated speed ratios γ1–γ8, $Y_{R1}$ and $Y_{R2}$ of the ten operating positions (1st trough 8th, R1, and R2).

In the specific example of FIG. 18, stepping ratios of the adjacent forward-drive positions of the first normal-spread group of the transmission 60, and an overall speed ratio range ("spread") of the first normal-spread group of eight forward-drive positions are determined as described below. Namely, the stepping ratio (γ1/γ2) which is a ratio of the speed ratio γ1 of the first-speed position to the speed ratio γ2 of the second-speed position is 1.480, and the stepping ratio (γ2/γ3) which is a ratio of the speed ratio γ2 of the second-speed position to the speed ratio γ3 of the third-speed position is 1.358. The stepping ratio (γ3/γ4) which is a ratio of the speed ratio γ3 of the third-speed position to the speed ratio γ4 of the fourth-speed position is 1.300. The stepping ratio (γ4/γ5) which is a ratio of the speed ratio γ4 of the fourth-speed position to the speed ratio γ5 of the fifth-speed position is 1.271. The stepping ratio (γ5/γ6) which is a ratio of the speed ratio γ5 of the fifth-speed position to the speed ratio γ6 of the sixth-speed position is also 1.211. The stepping ratio (γ6/γ7) which is a ratio of the speed ratio γ6 of the sixth-speed position to the speed ratio γ7 of the seventh-speed position is 1.275, and the stepping ratio (γ7/γ8) which is a ratio of the speed ratio γ7 of the seventh-speed position to the speed ratio γ8 of the eighth-speed position is 1.216. Thus, the speed ratios γ1–γ8 change as the geometric series. The overall speed ratio range or "spread"=γ1/γ8=4.020/0.645) of the first normal-spread group of eight forward-drive positions is about 6.231, which is relatively wide.

Figure 19:
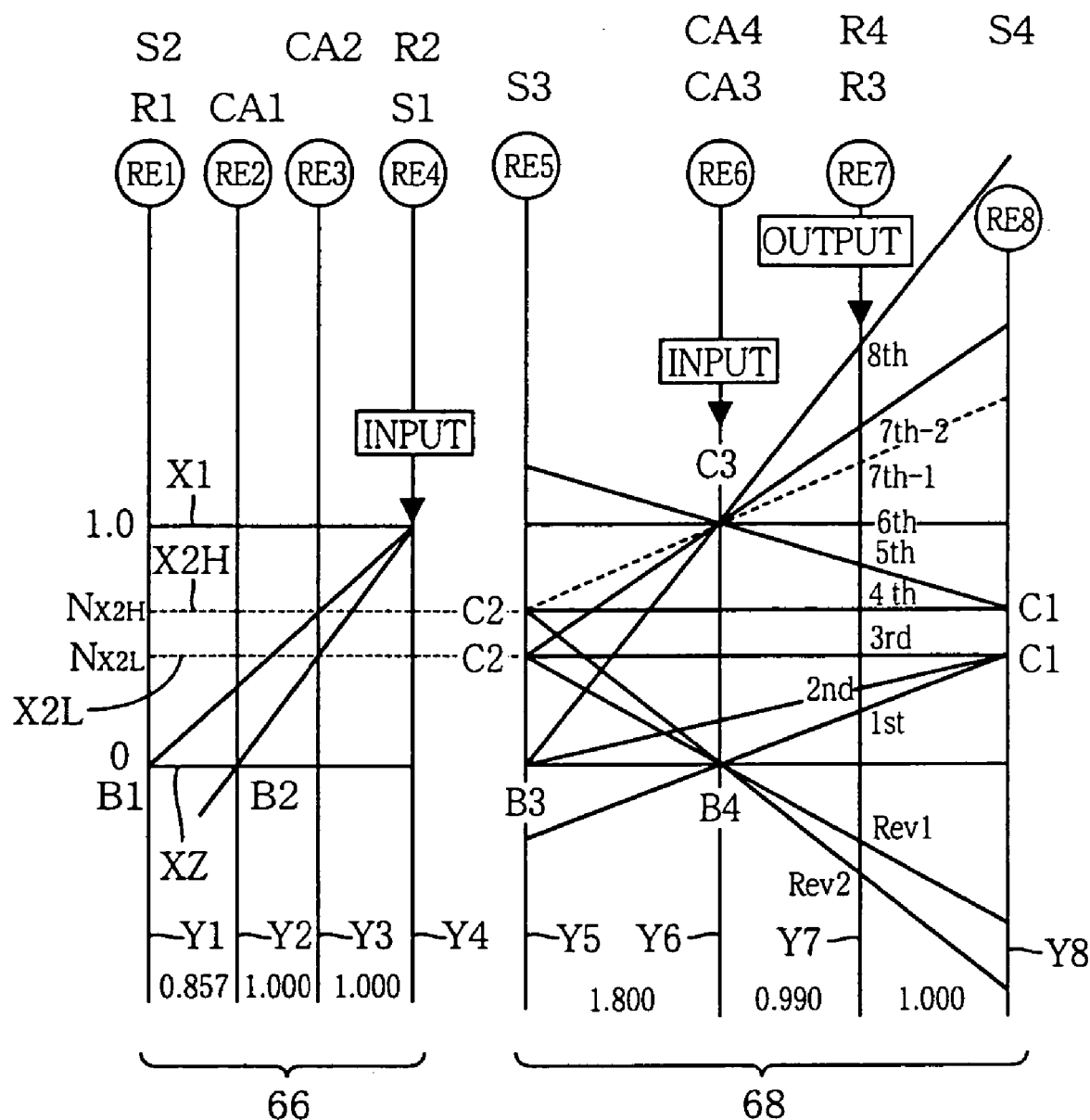
FIG. 19 is a collinear chart showing an operation of the automatic transmission of FIG. 17 when the normal-spread group of operating positions of FIG. 18 is selected.

The collinear chart of FIG. 19 indicates, by straight lines, a relationship among the rotating speeds of the rotary elements of the first and second shifting portions 66, 68 when the transmission 60 is placed in each of its operating positions. The collinear chart of FIG. 19 is a two-dimensional coordinate system which has a horizontal axis and a vertical axis and in which the gear ratios ρ1–ρ4 of the first through fourth planetary gear sets 18, 20, 22, 24 are taken along the horizontal axis, while the relative rotating speeds of the rotary elements are taken along the vertical axis. A lowermost one of four horizontal straight lines X1, X2H, H2L, XZ, that is, the horizontal straight line XZ indicates the rotating speed of "0", while an uppermost one of the four horizontal lines X1, X2H, X2L, XZ, that is, the horizontal straight line X1 indicates the rotating speed corresponding to the speed ratio of 1.0, that is, the rotating speed of the first intermediate output path M1 connected to the input shaft 16. The intermediate two horizontal straight lines X2H and X2L between the uppermost and lowermost horizontal straight lines X1, XZ respectively indicate the rotating speeds N×2H and N×2L of the second intermediate output path M2, which are lower than the rotating speed of the first intermediate output path M1. First four vertical straight lines Y1–Y4 as counted from the left end of the collinear chart of FIG. 19 correspond to the first shifting portion 66, and respectively correspond to a first rotary element RE1 in the form of the first ring gear R1 and second sun gear S2 connected to each other, a second rotary element RE2 in the form of the first carrier CA1, a third rotary element RE3 in the form of the second carrier CA2, and a fourth rotary element RE4 in the form of the first sun gear S1 and second ring gear R2 connected to each other. The distances between the adjacent ones of those four vertical straight lines Y1–Y4 are determined by the gear ratios ρ1 and ρ2 of the first and second planetary gear sets 18, 20. Four vertical straight lines Y5–Y8 on the right side of the above-indicated four vertical straight lines Y1–Y4 correspond to the second shifting portion 68, and respectively correspond a fifth rotary element RE5 in the form of the third sun gear S3, a sixth rotary element RE6 in the form of the third and fourth carriers CA3, CA4 connected to each other, a seventh rotary element RE8 in the form of the third and fourth ring gears R3, R4 connected to each other, and an eighth rotary element RE8 in the form of the fourth sun gear S4. The distances between the adjacent ones of the vertical straight lines Y5–Y8 are determined by the gear ratios ρ3 and ρ4 of the third and fourth planetary gear sets 22, 24.

Referring to the collinear chart of FIG. 19, the arrangement of the present transmission 60 will be described in further detail. In the first shifting portion 66, the first rotary element RE1 (first ring gear R1 and second sun gear S2) is selectively fixed by a first brake B1 to the transmission casing 12, and the second rotary element RE2 (first carrier CA1) is selectively fixed by a second brake B1 to the transmission casing 12. The third rotary element RE3 (second carrier CA2) is connected to the second intermediate output path M2, and the fourth rotary element RE4 (first sun gear S1 and second ring gear R2) is connected to the input shaft 16 (input rotary member) and the first intermediate output path M1, so that the rotary motion of the input shaft 16 is transmitted to the second shifting portion 68 through the first intermediate output path M1, and the second intermediate output path M2 the rotating speed of which is reduced with respect to that of the first intermediate output path M1. In the second shifting portion 68, the fifth rotary element RE5 (third sun gear S3) is selectively connected through a second clutch C2 to the second carrier CA2 (second intermediate output path M2), and is selectively fixed by a third brake B3 to the transmission casing 12, and the sixth rotary element RE6 (third and fourth carriers CA3, CA4) is selectively connected through a third clutch C3 to the fist sun gear S1 and second ring gear R2 (first intermediate output path M1), and is selectively fixed by a fourth brake to the transmission casing 12. The seventh rotary element RE7 (third and fourth ring gears R3, R4) is connected to the output shaft 26, and the eighth rotary element RE8 (fourth sun gear S4) is selectively connected by a first clutch C1 to the second carrier CA2.

As is apparent from the collinear chart of FIG. 19, a selected one of the ten operating positions (1st through 8th, R1 and R2) of the transmission 60 is established by simultaneous engaging actions of the corresponding combination of two or three frictional coupling devices selected from among the first clutch C1, second clutch C2, third clutch C3, first brake B1, second brake B2, third brake B3 and fourth brake B4, so that the corresponding rotary elements selected from the first through eighth rotary elements RE1–RE8 are connected to the first intermediate output path M1, for rotation at a speed corresponding to the speed ratio of 1.0, or connected to the second intermediate output path M2, for rotation at the speed N×2L or N×2H, or fixed to the transmission casing 12 and held stationary. The rotating speeds of the output shaft 26 when the transmission 60 is placed in the ten operating positions (1st-speed through 8th-speed positions, and first and second rear-drive positions R1, R2) are indicated along the vertical straight line Y7. In the first-speed position, for example, the second rotary element RE2 is fixed by the second brake B2 to the transmission casing 12 and held stationary, and the fourth rotary element RE4 is connected to the input shaft 16 and the first intermediate output path M1, for rotation at a speed corresponding to the speed ratio of 1.0. In this case, the rotating speed N×2L of the second intermediate output path M2 connected to the second shifting portion 68, which is reduced with respect to that of the first intermediate output path M1, is represented by a point of intersection of the vertical straight line Y3 and an inclined straight line which connects a point of intersection between the vertical straight line Y2 and the horizontal straight line XZ and a point of intersection between the vertical straight line Y4 and the horizontal straight line X1. The eighth rotary element RE8 is connected through the clutch C1 to the second intermediate output path M1 (carrier CA2), for rotation at the speed N×2L, and the sixth rotary element RE6 is fixed by the brake B4 to the transmission casing 12 and held stationary. The rotating speed of the output shaft 26 is represented by a point of intersection of the vertical straight line Y7 and an inclined line which connects a point of intersection between the vertical straight line Y8 and the horizontal straight line X2L and a point of intersection between the vertical straight line Y6 and the horizontal straight line XZ.

Figures 20, 21:
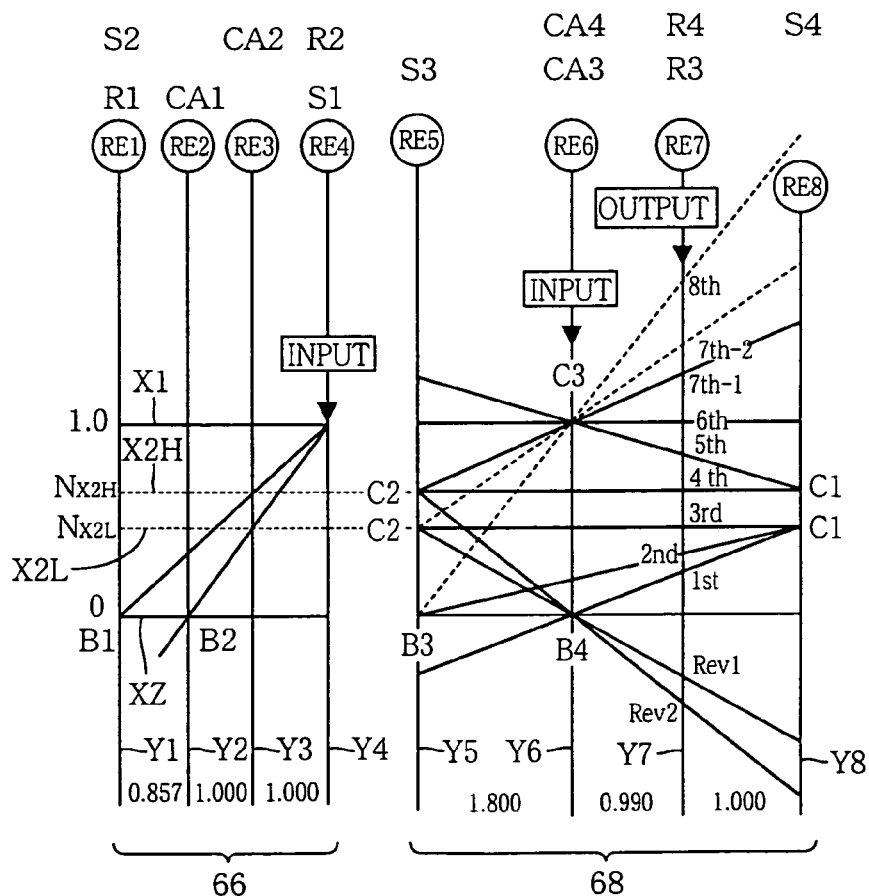
FIG. 20 is a view corresponding to that of FIG. 18, indicating a second normal-spread group of operating positions of the automatic transmission of FIG. 17.
FIG. 21 is a collinear chart showing an operation of the automatic transmission of FIG. 27 when the second normal-spread group of operating positions of FIG. 20 is selected.

As described above, the first-speed through eighth-speed positions (1st through 8th) indicated in FIG. 18 constitute the first normal-spread group of forward-drive positions which has the set of speed ratios γ1–γ8 and a relatively wide overall speed ratio range or spread. The seventh-speed position (7th-2) of this first normal-spread group is established by engaging the second brake B2 as well as the second and third clutches C2, C3. The present transmission 60 further has a second normal-spread group of seven forward-drive positions (1st through 7th-1) wherein the seventh-speed position (7th-1) is established by engaging the first brake B1 in place of the second brake B2, as well as the second and third clutches C2, C3, as indicated in FIGS. 20 and 21. As a result of engagement of the first brake B1 in place of the second brake B2, the rotating speed of the second intermediate output path M2 is changed from N×2L to N×2H. Accordingly, one of the first normal-spread group of FIG. 18 and the second normal-spread group of FIG. 20 can be selected without changing the operating states of the first, second and third clutches C1–C3 and the third and fourth brakes B3, B4 which are used in the second shifting portion 68.

In the second normal-spread group of FIG. 20, the eight forward-drive positions have the same overall speed ratio range or spread (γ1/γ8=6.231) as those of the normal-spread group of FIG. 18, but the seventh-speed position (7th-1) has a speed ratio γ7 of about 0.831 higher than that (0.784) of the normal-spread group of FIG. 18, and can be effectively used when a large vehicle drive force is required during a vehicle running at a relatively high speed, for example, or during a high-speed running on an uphill road or for rapid acceleration of the vehicle to go ahead of the preceding vehicle. In the present third embodiment, the first normal-spread group of FIG. 18 and the second normal-spread group of FIG. 20 are selectively used. However, the third embodiment may be modified such that the transmission 60 is shiftable to any one of the eight forward-drive positions of FIG. 18 or 20, or to any one of the seven forward-drive positions (1st through 7th-2 or 7th-1) of FIG. 18 or 20 while the selection of the eighth-speed position is inhibited. When only the seven forward-drive positions of FIG. 20 are available, the overall speed ratio range or spread (=γ1/γ7=4.020/0.831) is 4.837, which is narrower than the overall speed ratio range (=0.020/0.784=5.127) of the seven forward-drive positions (1st through 7th-2) of the normal-spread group of FIG. 18. Therefore, where the use of the eighth-speed position (8th) is inhibited, the highest-speed position (7th-1) of FIG. 20 provides a larger vehicle drive force at a relatively high running speed of the vehicle, than the highest-speed position (7th-2) of FIG. 18. In this respect, the seven forward-drive positions (1st through 7th-2) of FIG. 18 may be used as the normal-spread group, while the seven forward-drive positions (1st through 7th-1) of FIG. 20 may be used as the narrow-spread group. As is apparent from the collinear chart of FIG. 21 wherein the rotating speed of the output shaft 26 is indicated along the vertical straight line Y7, the rotating speed of the second intermediate output path M2 is changed to N×2H when the seventh-speed position (7th-1) of the second normal-spread group of FIG. 20 is established by engaging the first brake B1 in place of the second brake B2. Thus, the transmission 60 according to the third embodiment has the second normal-spread group of FIG. 20 wherein the seventh-speed position (7th-1) is established by engaging the first brake B1 as well as the second and third clutches C2, C3, and the first narrow-spread group of FIG. 18 wherein the seventh-speed position (7th-2) is established by engaging the second brake B2 as well as the second and third clutches C2, C3.

While the three embodiments of the present invention have been described above, the present invention may be otherwise embodied.

While the control routine including steps S1–S7 illustrated in the flow chart of FIG. 16 is formulated to select one of the normal-spread and narrow-spread groups of forward-drive positions of the transmission 10, a similar control routine is provided for selecting one of the normal-spread and wide-spread groups of forward-drive positions of the transmission 10, and for selecting one of the two normal-spread groups of forward-drive positions of the transmission 60, and one of two groups of forward-drive positions of a transmission of any other arrangement. Further, the shift control apparatus according to the principle of this invention is applicable to control an automatic transmission which has three groups of forward-drive positions, namely, the normal-spread group, the narrow-spread group and the wide-spread group, rather than the normal-spread group and the narrow-spread or wide-spread group. In essence, the control routine of FIG. 16 or a control routine similar to this control routine is provided to control the automatic transmission such that one of a plurality of groups of forward-drive positions having respective different sets of speed ratios is selected when it is necessary to increase the vehicle drive force with the transmission placed in one of at least one relatively high-speed position, such that the selected group is the group including the at least one relatively high-speed position which has a higher speed ratio than the other group or groups. In the illustrated embodiments, the two groups of forward-drive positions selectively available in the transmissions 10 and 60 are different from each other in the speed ratio of at least one relatively high-speed position, that is, in the speed ratio of the seventh-speed and eighth-speed positions or the seventh-speed position having a speed ratio or ratios lower than 1.0 (forward-drive position or positions in which the rotating speed of the output rotary element in the form of the output gear 28 or output shaft 26 is higher than that of the input rotary element in the form of the input shaft 16). However, the at least one relatively high-speed position the speed ratio of which is different between or among the two or more groups of forward-drive positions may consist of or may include at least one forward-drive position having a speed ratio not lower than 1.0. In this case, too, the vehicle can be driven with a comparatively large drive force when one of the two or more groups of forward-drive positions is selected according to the principle of the present invention.

In the transmissions 10, 60 in the illustrated embodiments, the first shifting portion 36, 66 including the first planetary gear set 18 or the first and second planetary gear sets 18, 20 is arranged to transmit the rotary motion of the input shaft 16 to the second shifting portion 38, 68 through the first intermediate output path M1 and the second intermediate output path M2 the speed of which is reduced with respect to that of the first intermediate output path M1. Where the transmission is of a parallel two-axes type having two parallel axes and two sets of counter gears, the first shifting portion 36, 66 may be modified to transmit the rotary motion of the input shaft 16 connected to one of the two axes to the second shifting portion 38, 68 provided on the other axis, through the two sets of counter gears which respectively correspond to the first and second intermediate output paths M1, M2 having different rotating speeds. In this case, one of the two sets of counter gears has a speed reduction ratio of 1.0, while the other set of counter gear has a speed reduction ratio higher than 1.0, so that the speed of the first intermediate output path M1 is equal to that of the input shaft 16, while the speed of the second intermediate output path M2 is reduced with respect to that of the first intermediate output path M1. The set of counter gears which corresponds to the first intermediate output path M1 and the above-indicated one of the two axes corresponds to the first intermediate output member, while the other set of counter gears which corresponds to the second intermediate output path M2 and the above-indicated other axis corresponds to the second intermediate output member. Although the above-described transmission of the parallel two-axes type has the two sets of counter gears corresponding to the first and second intermediate output paths, three or more sets of counter gears may be provided such that the rotary motion of the input shaft is transmitted to the second shifting portion through the corresponding three or more intermediate output paths, at the same or different speed ratio with respect to the speed of the input shaft. The transmission of the parallel two-axes type may use motion transmitting means other than the counter gears, such as a pulley-and-belt device, a sprocket mechanism, or a chain mechanism.

In the transmissions 10 and 60, the engine 8 and the torque converter 14 are connected to each other through the crankshaft 9. However, the engine 8 may be operatively connected to the torque converter 14 through a gear train, a belt or any other suitable connecting means, and the engine 8 and the torque converter 14 need not be disposed coaxially with each other. The engine 8 may be replaced by any other type of drive power source, such an electric motor.

The transmissions 10, 60 may be modified such that a one-way clutch is connected in series or parallel with any one of the clutches C1–C4 and brakes B1–B4, for facilitating a shifting control of the transmission. For instance, a one-way clutch is connected in parallel with the third brake B3 of the transmission 10, so that the first-speed position can be established by engaging only the first clutch C1. Further, any one of the clutches C1–C4 and brakes B1–B4 may be replaced by a one-way clutch.

Although the torque converter 14 disposed as a fluid-operated power transmitting device between the engine 8 and the input shaft 16 is provided with the lock-up clutch 13, the torque converter 14 need not be provided with this lock-up clutch 13. Further, the torque converter 14 may be replaced by a fluid coupling, an electromagnetic clutch of a power type, or a hydraulically operated clutch of a multiple-disc or single-disc type.

Although the collinear charts of FIGS. 3, 5, 7, 9, 19 and 21 are arranged such that the vertical straight lines Y1–Y8 are arranged in the rightward direction, these lines may be arranged in the leftward direction. While the horizontal straight line X1 corresponding to the speed ratio of 1.0 is located above the horizontal straight line XZ corresponding to the rotating speed of 0, the line X1 may be located below the line XZ.

While the transmissions 10, 60 use the hydraulically operated frictional coupling devices in the form of clutches C and brakes B, the transmission may use other types of frictional coupling devices such as electromagnetic clutches, powder-type clutches and any other electromagnetically operated coupling devices.

It is to be understood that the present invention may be embodied with various other changes, modifications and improvements, which may occur to those skilled in the art, in the light of the foregoing technical teachings.

What is claimed is:

1. A shift control apparatus for controlling shifting actions of a step-variable automatic transmission for a vehicle, which has a plurality of selectable groups of forward-drive positions having respective different sets of speed ratios, each one of said plurality of selectable groups of forward-drive positions including at least one high-speed position each having a speed ratio which is different from that of each high-speed position of any other of said plurality of selectable groups, the shift control apparatus comprising:

a drive-force-increase determining portion operable to determine whether it is necessary to increase a drive force of the vehicle with said automatic transmission placed in one of said at least one high-speed position; and a drive-position-group selecting portion operable to select one of said plurality of selectable groups of forward-drive positions which includes said at least one high-speed position each having the speed ratio higher than that of each high-speed position of any other of said plurality of selectable groups, when said drive-force-increase determining portion has determined that it is necessary to increase the drive force of the vehicle with said automatic transmission placed in one of said at least one high-speed position.

2. The shift control apparatus according to claim 1, wherein said drive-force-increase determining portion determines that it is necessary to increase the drive force of the vehicle, when the vehicle is in a condition that causes frequent shifting actions of the automatic transmission.

3. The shift control apparatus according to claim 1, wherein said drive-force-increase determining portion includes an uphill road determining portion operable to determine whether the vehicle is running on an uphill roadway, and the drive-force-increase determining portion determines that it is necessary to increase the drive force of the vehicle, when said uphill road determining portion has determined that the vehicle is running on the uphill roadway.

4. The shift control apparatus according to claim 3, wherein said uphill road determining portion is operable to determine whether the vehicle is running on the uphill roadway, on the basis of a detected running speed of the vehicle and a detected acceleration value of the vehicle.

5. The shift control apparatus according to claim 1, wherein said drive-force-increase determining portion includes an uphill road determining portion operable to determine a position of the vehicle and determine, on the basis of the determined position of the vehicle, whether the vehicle is running or going to run on an uphill roadway, and said drive-force-increase determining portion determines that it is necessary to increase the drive force of the vehicle, when the uphill road determining portion has determined that the vehicle is running or going to run on the uphill roadway.

6. The shift control apparatus according to claim 1, wherein said drive-force-increase determining portion includes a tracing control determining portion operable to determine whether the vehicle is under a tracing control to trace a preceding vehicle running in from of said vehicle, and said drive-force-increase determining portion determines that it is necessary to increase the drive force of the vehicle, when said tracing control determining portion has determined that the vehicle is under said tracing control.

7. The shift control apparatus according to claim 6, wherein the vehicle comprises a vehicle-to-vehicle distance sensor operable to detect a distance between the vehicle and said preceding vehicle, and said tracing control is effected to control a running speed of said vehicle such that the distance detected by said vehicle-to-vehicle distance sensor is maintained at a predetermined value, so that the vehicle traces the preceding vehicle.

8. The shift control apparatus according to claim 1, wherein said drive-force-increase determining portion includes a vehicle weight determining portion operable to determine whether a total weight of the vehicle is larger than a predetermined threshold value, and said drive-force-increase determining portion determines that it is necessary to increase the drive force of the vehicle, when said vehicle weight determining portion has determined that the total weight of the vehicle is larger than the predetermined threshold value.

9. The shift control apparatus according to claim 1, characterized in that said automatic transmission has an input rotary member and an output rotary member, and the speed ratio of each of the forward-drive positions of said plurality of selectable groups is a ratio of a rotating speed of said input rotary member to a rotating speed of said output rotary member.

10. The shift control apparatus according to claim 9, characterized in that the speed ratio of each of said at least one high-speed position is lower than 1.0.

11. The shift control apparatus according to claim 1, characterized in that said at least one high-speed position consists of a plurality of high-speed positions.

12. The shift control apparatus according to claim 1, characterized in that said at least one high-speed position consists of a single high-speed position.

* * * * *